US012608494B2

(12) United States Patent
Deguchi et al.

(10) Patent No.: US 12,608,494 B2
(45) Date of Patent: Apr. 21, 2026

(54) STORAGE AND DATA PROTECTION METHOD OF STORAGE

(71) Applicant: Hitachi, Ltd., Tokyo (JP)

(72) Inventors: Akira Deguchi, Tokyo (JP); Yusuke Yamaga, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 65 days.

(21) Appl. No.: 18/596,785

(22) Filed: Mar. 6, 2024

(65) Prior Publication Data

US 2025/0068749 A1      Feb. 27, 2025

(30) Foreign Application Priority Data

Aug. 25, 2023    (JP) ................................. 2023-137013

(51) Int. Cl.
| | |
|---|---|
| *G06F 21/62* | (2013.01) |
| *G06F 11/14* | (2026.01) |
| *G06F 11/1446* | (2026.01) |
| *G06F 21/78* | (2013.01) |

(52) U.S. Cl.
CPC .......... *G06F 21/62* (2013.01); *G06F 11/1451* (2013.01); *G06F 11/1464* (2013.01); *G06F 2201/825* (2013.01); *G06F 2201/84* (2013.01)

(58) Field of Classification Search
CPC .. G06F 21/62; G06F 11/1451; G06F 11/1464; G06F 2201/825; G06F 2201/84; G06F 2201/81; G06F 11/1461; G06F 11/1469; G06F 21/78
See application file for complete search history.

(56) References Cited

U.S. PATENT DOCUMENTS

| | | | | |
|---|---|---|---|---|
| 10,078,641 | B1 * | 9/2018 | Redko ................. | G06F 11/1448 |
| 2008/0114771 | A1 * | 5/2008 | Welingkar .......... | H04L 41/0846 |
| 2009/0125577 | A1 * | 5/2009 | Kodama ............. | G06F 11/1458 |
| | | | | 709/201 |
| 2017/0054803 | A1 * | 2/2017 | Kato ................... | H04L 67/1097 |
| 2017/0180394 | A1 * | 6/2017 | Crofton .................. | G06F 21/64 |
| 2019/0342330 | A1 * | 11/2019 | Wu ...................... | H04L 63/1441 |
| 2020/0226256 | A1 * | 7/2020 | Gaurav ................ | G06F 21/565 |

(Continued)

FOREIGN PATENT DOCUMENTS

| | | | |
|---|---|---|---|
| JP | 2021-149773 | A | 9/2021 |
| JP | 2023-1471 | A | 1/2023 |
| JP | 2023-503760 | A | 2/2023 |

OTHER PUBLICATIONS

Japanese Office Action received in corresponding Japanese Application No. 2023-137013 dated Aug. 19, 2025.

*Primary Examiner* — Darren B Schwartz
(74) *Attorney, Agent, or Firm* — MATTINGLY & MALUR, PC

(57) ABSTRACT

To safely store data. A storage 200 connected to another storage 400 via a network, the storage 200 including: a processor 216 configured to process data to be stored in a storage device 220, in which the processor 216 is configured to acquire a first snapshot for a volume generated using a storage area of the storage device, compare a second snapshot, which is a previously acquired snapshot, with the first snapshot to retrieve incremental data, transfer the incremental data to the other storage and store the incremental data as backup data, and set lock of the backup data stored in the other storage.

10 Claims, 28 Drawing Sheets

(56) References Cited

U.S. PATENT DOCUMENTS

| | | |
|---|---|---|
| 2021/0294701 A1 | 9/2021 | Satoyama et al. |
| 2021/0336970 A1 | 10/2021 | Woo |
| 2022/0138169 A1* | 5/2022 | Yelheri ................. G06F 16/182 |
| | | 707/695 |
| 2022/0405237 A1 | 12/2022 | Matsushita et al. |
| 2023/0103474 A1* | 4/2023 | Gunda ................ G06F 11/1448 |
| | | 711/162 |
| 2024/0160605 A1* | 5/2024 | Katuri ................... G06F 16/128 |
| 2024/0211598 A1* | 6/2024 | Zhang ................... G06F 21/566 |
| 2024/0248985 A1* | 7/2024 | Vokaliga ................. G06F 21/56 |
| 2024/0273186 A1* | 8/2024 | George .............. G06F 21/6218 |

* cited by examiner

SNAPSHOT TABLE

| CONSISTENCY GROUP NUMBER | VOLUME NUMBER | SNAPSHOT NUMBER | SNAPSHOT LOCK SETTING | SNAPSHOT LOCK PERIOD | ACCESS MODE |
|---|---|---|---|---|---|
| 1 | VOLUME 1-1 | 1 | ON | 4/25 15:00 | RD |
| | | 2 | ON | 4/26 15:00 | RD |
| | | 3 | ON | 4/27 15:00 | RD |
| | | ... | ... | ... | ... |
| | VOLUME 1-2 | ... | ... | ... | ... |

FIG. 11

CATALOG 1000

| VOLUME NUMBER |
| --- |
| STORAGE NUMBER |
| ACQUIRED GENERATION INFORMATION |

BACKUP INFORMATION 1001

| GENERATION NUMBER |
| --- |
| VOLUME NUMBER |
| STORAGE NUMBER |
| TIME |
| TYPE |

DIFFERENTIAL INFORMATION 1002

| DIFFERENTIAL DATA PRESENCE/ ABSENCE INFORMATION (ADDRESS 0) |
| --- |
| DIFFERENTIAL DATA PRESENCE/ ABSENCE INFORMATION (ADDRESS 1) |
| DIFFERENTIAL DATA PRESENCE/ ABSENCE INFORMATION (ADDRESS 2) |
| DIFFERENTIAL DATA PRESENCE/ ABSENCE INFORMATION (ADDRESS 3) |
| . . . |

DATA 1003

| DATA |
| --- |
| DATA |
| . . . |

2211

BACKUP TABLE

| VOLUME NUMBER | OBJECT BUCKET | OBJECT LOCK SETTING | ACQUISITION FREQUENCY | LOCK PERIOD | BACKUP HOLDING PERIOD |
|---|---|---|---|---|---|
| VOLUME 1-1 | BUCKET A | ON | Daily | 7 days | 7 days |
| | | | Weekly | 4 weeks | 4 weeks |
| VOLUME 1-2 | BUCKET A | ON | Weekly | 4 weeks | 4 weeks |
| VOLUME 1-3 | BUCKET A | OFF | Weekly | - | 4 weeks |
| ... | ... | ... | ... | ... | ... |

FIG. 13

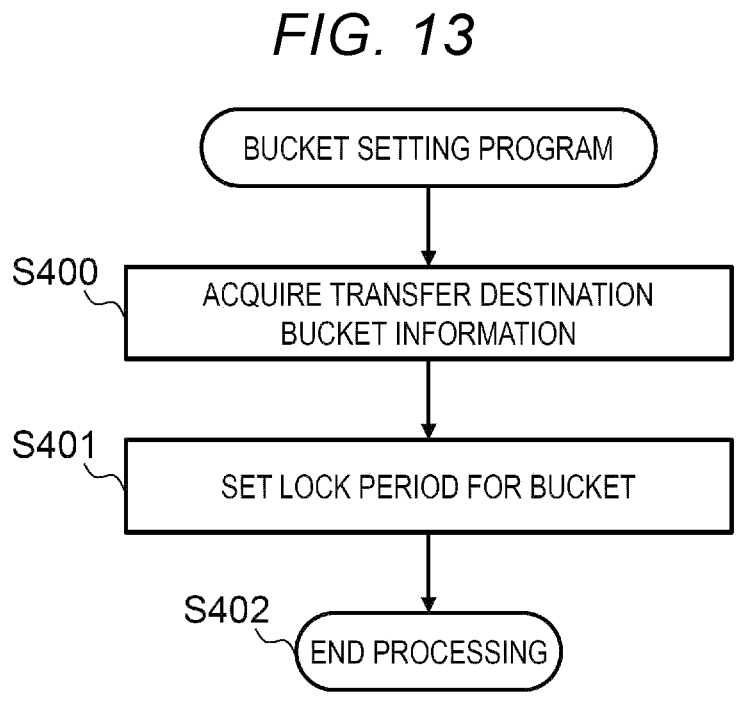

```
      ┌────────────────────────────────┐
      │   BUCKET SETTING PROGRAM       │
      └────────────────────────────────┘
                      │
                      ▼
S400  ┌────────────────────────────────┐
      │  ACQUIRE TRANSFER DESTINATION  │
      │      BUCKET INFORMATION        │
      └────────────────────────────────┘
                      │
                      ▼
S401  ┌────────────────────────────────┐
      │   SET LOCK PERIOD FOR BUCKET   │
      └────────────────────────────────┘
                      │
                      ▼
S402  ┌────────────────────────────────┐
      │        END PROCESSING          │
      └────────────────────────────────┘
```

BACKUP PERFORMANCE TABLE

| VOLUME NUMBER | OBJECT BUCKET | TRANSFER PERFORMANCE |
|---|---|---|
| VOLUME 1-1 | BUCKET A | 10MB/s |
| VOLUME 1-2 | BUCKET A | 10MB/s |
| . . . | . . . | . . . |

*FIG. 18*

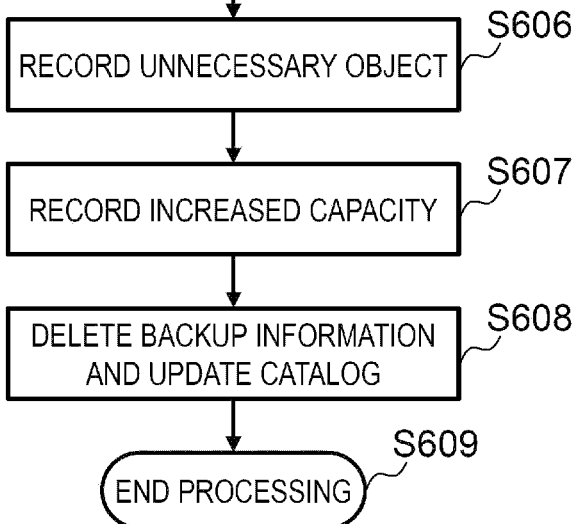

BACKUP DELETION
PROGRAM

DIFFERENTIAL MERGE
PROGRAM

RECEIVE DELETION REQUEST — S600

MERGE GENERATIONS 1, 2, 3, AND 4 → 5

ACQUIRE DIFFERENTIAL
INFORMATION OF EACH
GENERATION — S601

SPECIFY DATA NECESSARY
AFTER MERGE USING
DIFFERENTIAL INFORMATION — S602

READ OUT DATA OF EACH
GENERATION AND GENERATE
DATA AFTER MERGE — S603

STORE DATA AFTER MERGE — S604

NOTIFY INCREASED CAPACITY — S605

RECORD UNNECESSARY OBJECT — S606

RECORD INCREASED CAPACITY — S607

DELETE BACKUP INFORMATION
AND UPDATE CATALOG — S608

END PROCESSING — S609

FIG. 20

LOCK MANAGEMENT TABLE

| VOLUME NUMBER | BACKUP GENERATION | REQUESTED LOCK PERIOD | ALREADY-SET LOCK PERIOD | NECESSITY |
|---|---|---|---|---|
| VOLUME 1-1 | 1 | 9/30 15:00 | 4/25 15:00 | UNNECESSARY |
|  | 2 | 9/30 15:00 | 4/26 15:00 | NECESSARY |
| . . . | . . . | . . . | . . . | . . . |

FIG. 24

POOL TABLE

| PAGE NUMBER | START ADDRESS | END ADDRESS | STATE | ALLOCATION DESTINATION |
|---|---|---|---|---|
| 1 | 0 | 99 | ALREADY ALLOCATED | VOLUME 1 |
| 2 | 100 | 199 | ALREADY ALLOCATED | VOLUME 1 |
| 3 | 200 | 299 | ALREADY ALLOCATED | VOLUME 5 |
| 4 | 300 | 399 | NOT ALLOCATED | — |
| ... | ... | ... | ... | ... |

FIG. 25
VOLUME TABLE

| VIRTUAL VOLUME NUMBER | ADDRESS | PAGE ALLOCATION STATE | PAGE NUMBER | READ FREQUENCY (TIMES/hr) | WRITE FREQUENCY (TIMES/hr) |
|---|---|---|---|---|---|
| 1 | 0~99 | ALREADY ALLOCATED | 2 | 100 | 20 |
| 1 | 100~199 | ALREADY ALLOCATED | OBJECT/ BUCKET | 1 | 1 |
| 1 | 200-299 | ALREADY ALLOCATED | OBJECT/ BUCKET | 0 | 0 |
| 1 | 300-399 | NOT ALLOCATED | — | — | — |

*FIG. 26*

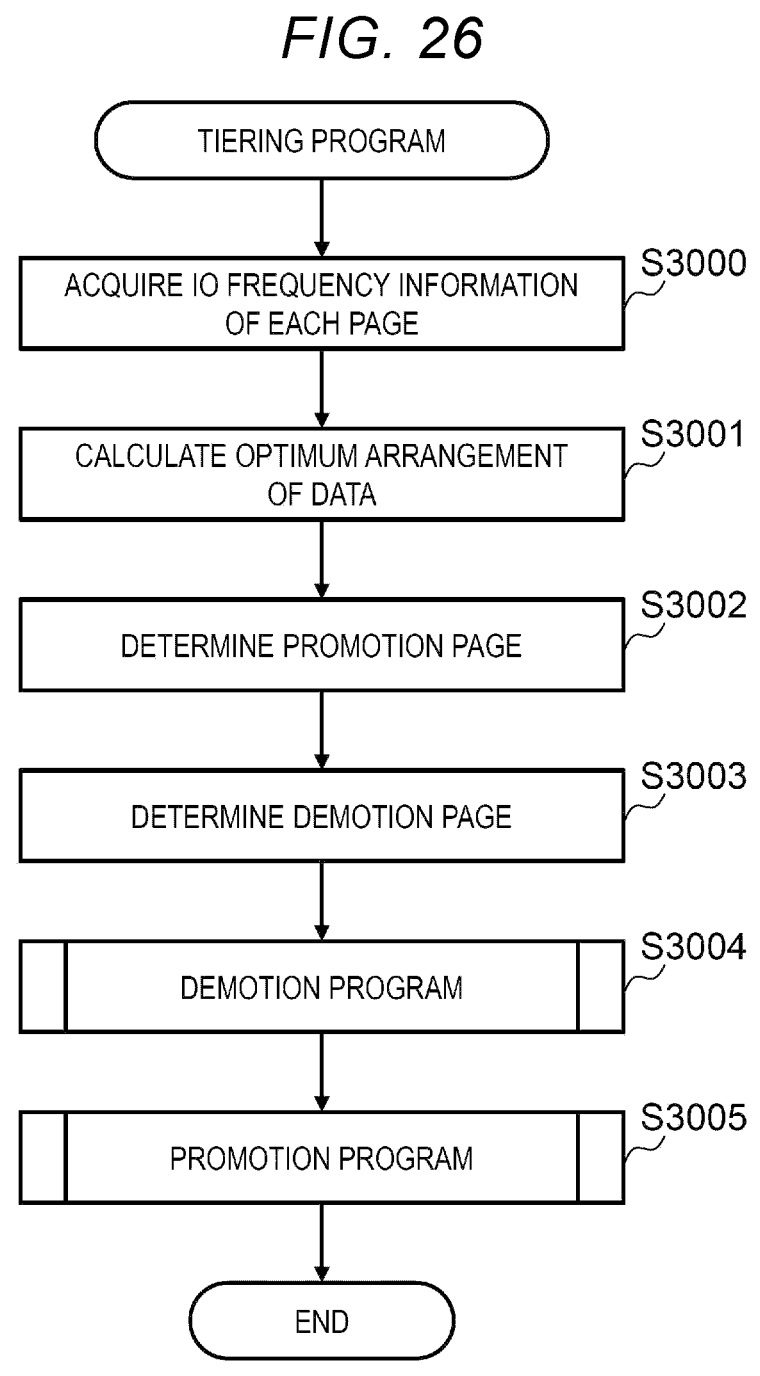

```
        ┌─────────────────────────┐
        │     TIERING PROGRAM     │
        └─────────────────────────┘
                    │
                    ▼
    ┌──────────────────────────────────┐   S3000
    │ ACQUIRE IO FREQUENCY INFORMATION │
    │          OF EACH PAGE            │
    └──────────────────────────────────┘
                    │
                    ▼
    ┌──────────────────────────────────┐   S3001
    │   CALCULATE OPTIMUM ARRANGEMENT  │
    │             OF DATA              │
    └──────────────────────────────────┘
                    │
                    ▼
    ┌──────────────────────────────────┐   S3002
    │     DETERMINE PROMOTION PAGE     │
    └──────────────────────────────────┘
                    │
                    ▼
    ┌──────────────────────────────────┐   S3003
    │     DETERMINE DEMOTION PAGE      │
    └──────────────────────────────────┘
                    │
                    ▼
    ┌──┬────────────────────────────┬──┐   S3004
    │  │     DEMOTION PROGRAM       │  │
    └──┴────────────────────────────┴──┘
                    │
                    ▼
    ┌──┬────────────────────────────┬──┐   S3005
    │  │     PROMOTION PROGRAM      │  │
    └──┴────────────────────────────┴──┘
                    │
                    ▼
             ┌─────────────┐
             │     END     │
             └─────────────┘
```

FIG. 28

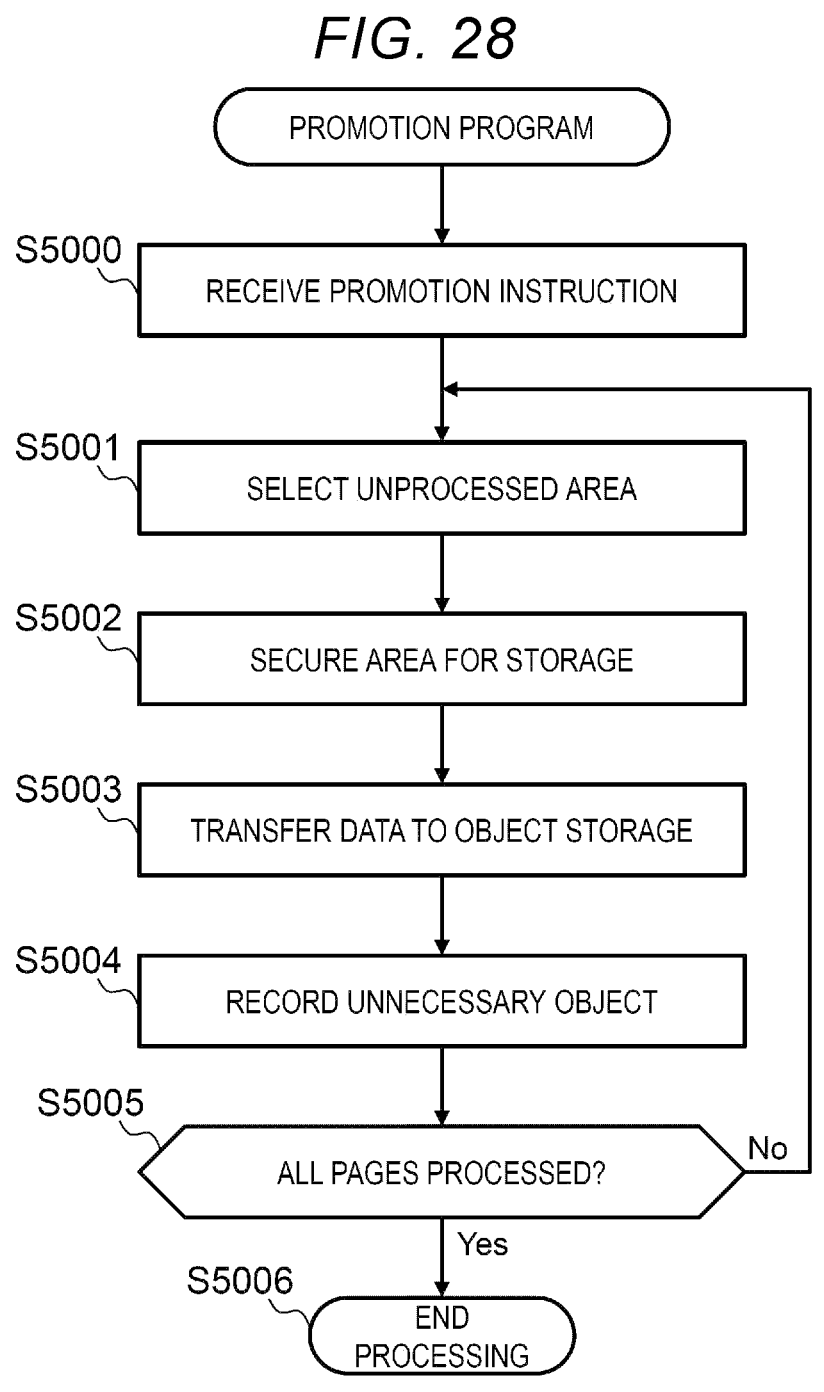

PROMOTION PROGRAM

S5000 — RECEIVE PROMOTION INSTRUCTION

S5001 — SELECT UNPROCESSED AREA

S5002 — SECURE AREA FOR STORAGE

S5003 — TRANSFER DATA TO OBJECT STORAGE

S5004 — RECORD UNNECESSARY OBJECT

S5005 — ALL PAGES PROCESSED? — No

Yes

S5006 — END PROCESSING

STORAGE AND DATA PROTECTION METHOD OF STORAGE

CROSS-REFERENCE TO RELATED APPLICATION

The present application claims priority from Japanese application JP2023-137013, filed on Aug. 25, 2023, the content of which is hereby incorporated by reference into this application.

BACKGROUND OF THE INVENTION

1. Field of the Invention

The present disclosure relates to a storage and a data protection method of a storage.

2. Description of Related Art

A storage has a snapshot function for protecting data. The snapshot function is a logical copy, at a certain moment, of a volume in which user data is stored. Further, in recent years, a backup method of storing backup data in a public cloud has appeared. Specifically, there is a backup to an object storage service of a public cloud characterized by low price. Patent Literature 1 describes that "A local storage creates a backup area to be a backup destination of data written in a business volume. The local storage associates the backup area with a server system that provides access from the local storage to a cloud storage. The local storage writes data accompanying a write request to the business volume and backs up the data in the backup area. The local storage transmits the data from the backup area to the server system in order to write the data to the cloud storage."

CITATION LIST

Patent Literature

Patent Literature 1: JP2021-149773A

SUMMARY OF THE INVENTION

In recent years, there has been an increasing number of cyber attacks such as Ransomware. A snapshot function is used to protect data stored in a storage from such attacks. On the other hand, cyber attacks are also highly advanced year by year, and attacks on protected data are also increasing. Specifically, an attack such as deleting a snapshot or destroying data by writing to a snapshot is considered. Further, data backed up to an object storage such as the above-described public cloud may also be an attack target. In the case of a public cloud, it is connected from an IT device installed in a data center of an on-premises via a network, and therefore, there is an access path from outside the public cloud, and there is a concern about security.

An object of the present disclosure is to provide a data protection method for further strengthening data protection using a snapshot function in a storage and data protection of data to be transferred to the outside of the storage.

In order to implement the above object, a representative storage according to the present invention is a storage connected to another storage via a network, the storage including: a processor configured to process data to be stored in a storage device, in which the processor is configured to acquire a first snapshot for a volume generated using a storage area of the storage device, compare a second snapshot, which is a previously acquired snapshot, with the first snapshot to retrieve incremental data, transfer the incremental data to the other storage and store the incremental data as backup data, and set lock of the backup data stored in the other storage.

A representative data protection method of a storage according to the present invention is a data protection method of a storage, which includes a processor configured to process data to be stored in a storage device and which is connected to another storage via a network, the method including the processor acquiring a first snapshot for a volume generated using a storage area of the storage device, comparing a second snapshot, which is a previously acquired snapshot, with the first snapshot to retrieve incremental data, transferring the incremental data to the other storage and storing the incremental data as backup data, and setting lock of the backup data stored in the other storage.

According to the present invention, data can be stored more safely. Problems, configurations, and effects other than those described above will become apparent by the following description of embodiments.

BRIEF DESCRIPTION OF THE DRAWINGS

FIG. 2 is a diagram illustrating a configuration example of a storage.

FIG. 5 is a flowchart illustrating an example of snapshot lock processing.

FIG. 11 is a diagram illustrating an example of a catalog, generation information, differential information, and data.

FIG. 13 is a flowchart illustrating an example of lock setting processing.

FIG. 15 is a flowchart illustrating an example of detection processing for backup processing delay.

FIG. 16 is a diagram illustrating an example of a backup performance table.

FIG. 18 is a flowchart illustrating an example of backup deletion processing.

FIG. 20 is a diagram illustrating an example of a lock management table.

FIG. 24 is a diagram illustrating an example of a pool table.

FIG. 25 is a diagram illustrating an example of a volume table.

FIG. 26 is a flowchart illustrating an example of tiering processing.

FIG. 28 is a flowchart illustrating an example of promotion processing.

DESCRIPTION OF EMBODIMENTS

Hereinafter, embodiments of the present disclosure will be described with reference to the drawings.

In the following description, processing may be described with a "program" as an operation subject, but since the program is executed by a processor unit to perform determined processing using at least one of a storage unit and an interface unit as appropriate, the subject of the processing may be the processor unit (or a computer or a storage system including the processor unit). The program may be installed in the computer from a program source. The program source may be, for example, a program distribution server or a computer-readable storage medium. In the following description, two or more programs may be implemented as one program, or one program may be implemented as two or more programs. At least a part of the processing implemented by executing the program may be implemented by a hardware circuit (for example, an application specific integrated circuit (ASIC) or a field-programmable gate array (FPGA)).

First Embodiment

Figure 1:
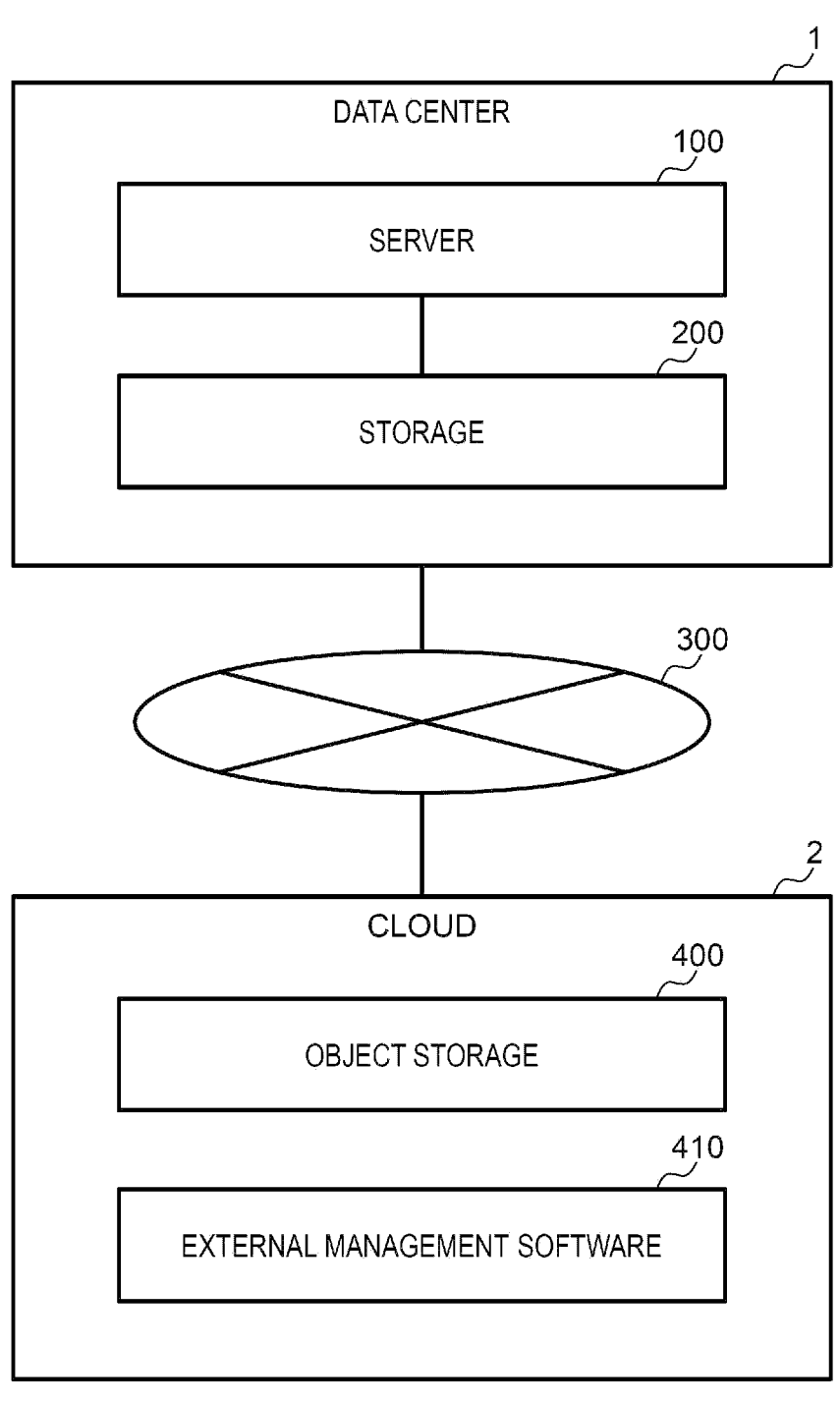
FIG. 1 is a diagram illustrating a storage system according to a first embodiment of the present disclosure.

FIG. 1 is a diagram illustrating a storage system according to the first embodiment of the present disclosure. The storage system illustrated in FIG. 1 includes a data center (on-premises) 1 including a server 100 and a storage 200, and a cloud 2 including an object storage 400 and external management software 410, and the data center 1 and the cloud 2 are communicably connected to each other via a network 300. A plurality of such configurations may be provided. The data center 1 may be a public cloud.

The data center 1 functions as a main site that performs business processing in a normal state. The cloud 2 functions as a sub site (sub environment) that stores backup data of data related to the business processing of the data center 1 and that takes over the business processing of the server 100 in a specific state such as a disaster. A sub server may be disposed in the sub site. The external management software 410 is management software that manages the storage 200 and the object storage 400. An example of operating on the cloud 2 is illustrated, but the external management software 410 may operate on the data center 1 or another data center.

The server 100 is a host that performs business processing by executing an application program and a computer program for performing business processing such as middleware (hereinafter, referred to as an application program). The storage 200 is a first storage device that stores data used and generated in the business processing by the server 100, and stores data corresponding to an I/O request (read/write request) from the server 100.

The object storage 400 is a storage device that stores backup data of the data stored in the main storage 200. In the present embodiment, the backup data is used as restoration data for restoring data in the sub site, and the object storage 400 functions as a restoration storage device for storing the restoration data. The object storage 400 may be a storage device that is less expensive than the storage 200, and in the present embodiment, is an object storage device that is generally inexpensive and that stores data in units of objects. In the present embodiment, an object storage is described as an example, but a storage other than an object storage may be used as long as the storage is less expensive than the storage 200. A file storage or the like may be used. A storage service provided by a storage vendor on a public cloud may be used. The cloud 2 may be a data center other than the data center 1 instead of the public cloud.

Figure 2:
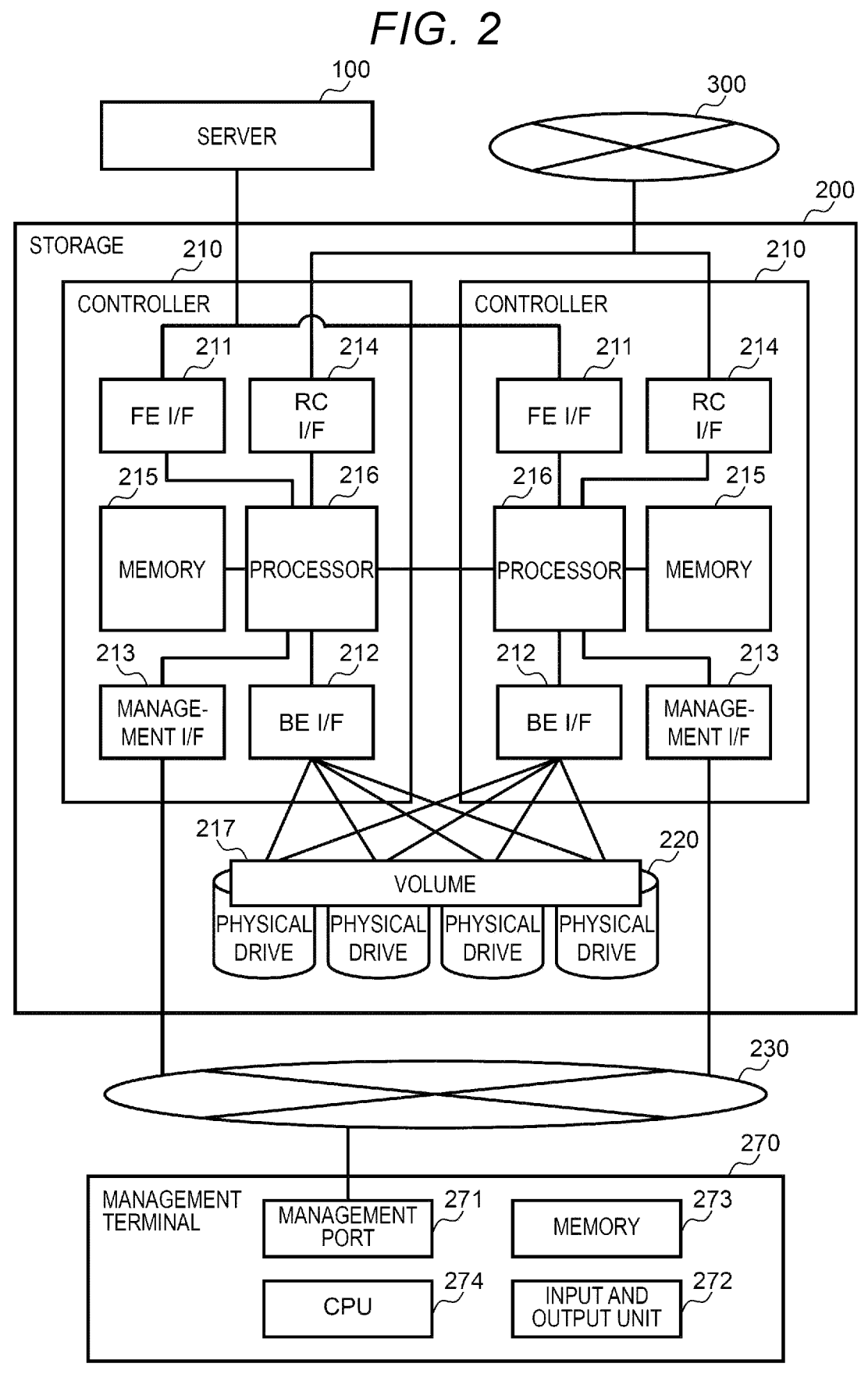

FIG. 2 is a diagram illustrating a configuration example of the storage 200 and a management terminal 270 connected to the storage 200. As illustrated in FIG. 2, the storage 200 includes one or more controllers 210 and one or more physical drives 220. In the example of FIG. 2, two controllers 210 and five physical drives 220 are illustrated. Each of the controllers 210 is a control unit that controls the I/O request from the server 100, controls reading and writing of data from and to the physical drives 220, and controls processing of transferring data to a cloud. Each controller 210 includes a front-end (FE) I/F 211, a back-end (BE) I/F 212, a management I/F 213, a remote copy (RC) I/F 214, a memory 215, and a processor 216.

The FE I/F 211 is an interface for communicably connecting to the server 100, and includes a plurality of Fibre Channel ports in the present embodiment. However, the FE I/F 211 may include a port other than the Fibre Channel, such as an iSCSI port, instead of the Fibre Channel port.

The BE I/F 212 is an interface for communicably connecting to the physical drive 220. The management I/F 213 is an interface for communicably connecting to the management terminal 270 via a management network 230. The RC I/F 214 is an interface for communicably connecting to the object storage 400 of the cloud 2 via the network 300. The RC I/F 214 includes, for example, a plurality of Internet Protocol (IP) ports. A Fibre Channel port may be provided. The FE I/F 211, the RC I/F 214, and the BE I/F 212 may share one I/F board.

The memory 215 records a program that defines an operation of the processor 216, control information used in the program, and the like. The memory 215 can also store data as a cache of data to be stored in the physical drive 220. The processor 216 executes various processing by executing the program recorded in the memory 215.

The physical drive 220 is a physical data storage device that stores data. The plurality of physical drives 220 may constitute one or more redundant array of independent (or inexpensive) disks (RAID) groups. A main volume 217 is configured over the plurality of physical drives 220, and is provided to the server 100.

The management terminal 270 is a terminal for performing maintenance and management of the storage 200, and includes a management port 271, an input and output unit 272, a memory 273, and a CPU 274. The management port 271 is communicably connected to the storage 200 via the management network 230. The input and output unit 272 has an input function of receiving various information from a user who uses the management terminal 270 and an output function of outputting various information to the user. The memory 273 stores various programs that define an operation of the CPU 274. The CPU 274 reads the programs recorded in the memory 273 and executes the read programs to execute various processing for performing maintenance and management of the storage 200.

Figure 22:
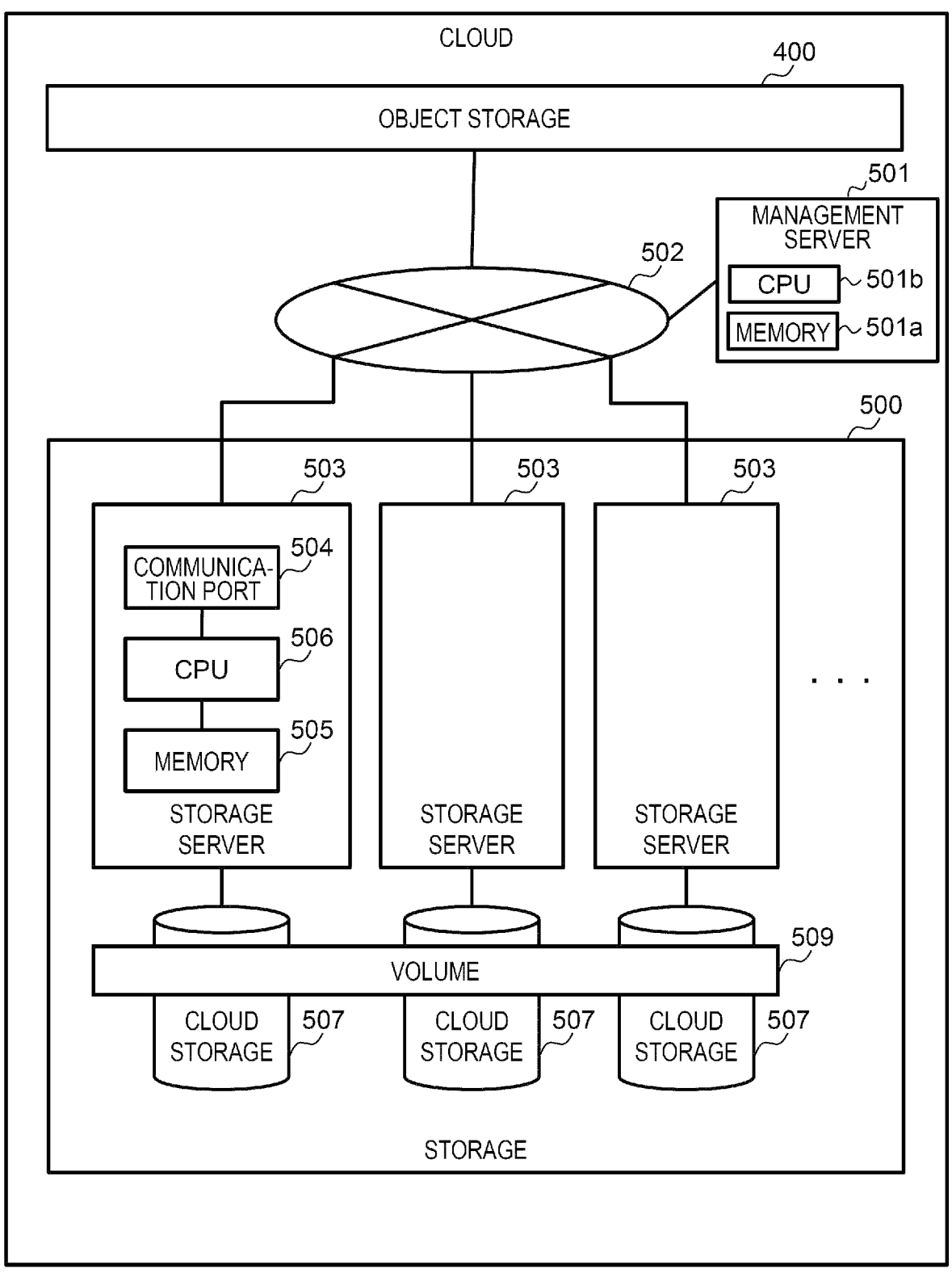
FIG. 22 is a diagram illustrating another configuration example of the storage.

A configuration of the storage 200 illustrated in FIG. 2 is merely an example, and is not limited thereto. For example, the storage 200 may be a software defined storage (SDS) or the like that implements a function of a storage by using a program that executes storage processing in each of a plurality of servers. FIG. 22 illustrates an example of SDS. Since the SDS in FIG. 22 operates on a public cloud, the storage server 503 is a virtual machine, but may be a physical server.

The storage 200 may include hardware that performs specific processing or the like. Examples of this type of hardware include hardware for compressing data and hardware for encrypting data. The storage 200 may be a storage device provided as a service.

Figure 3:
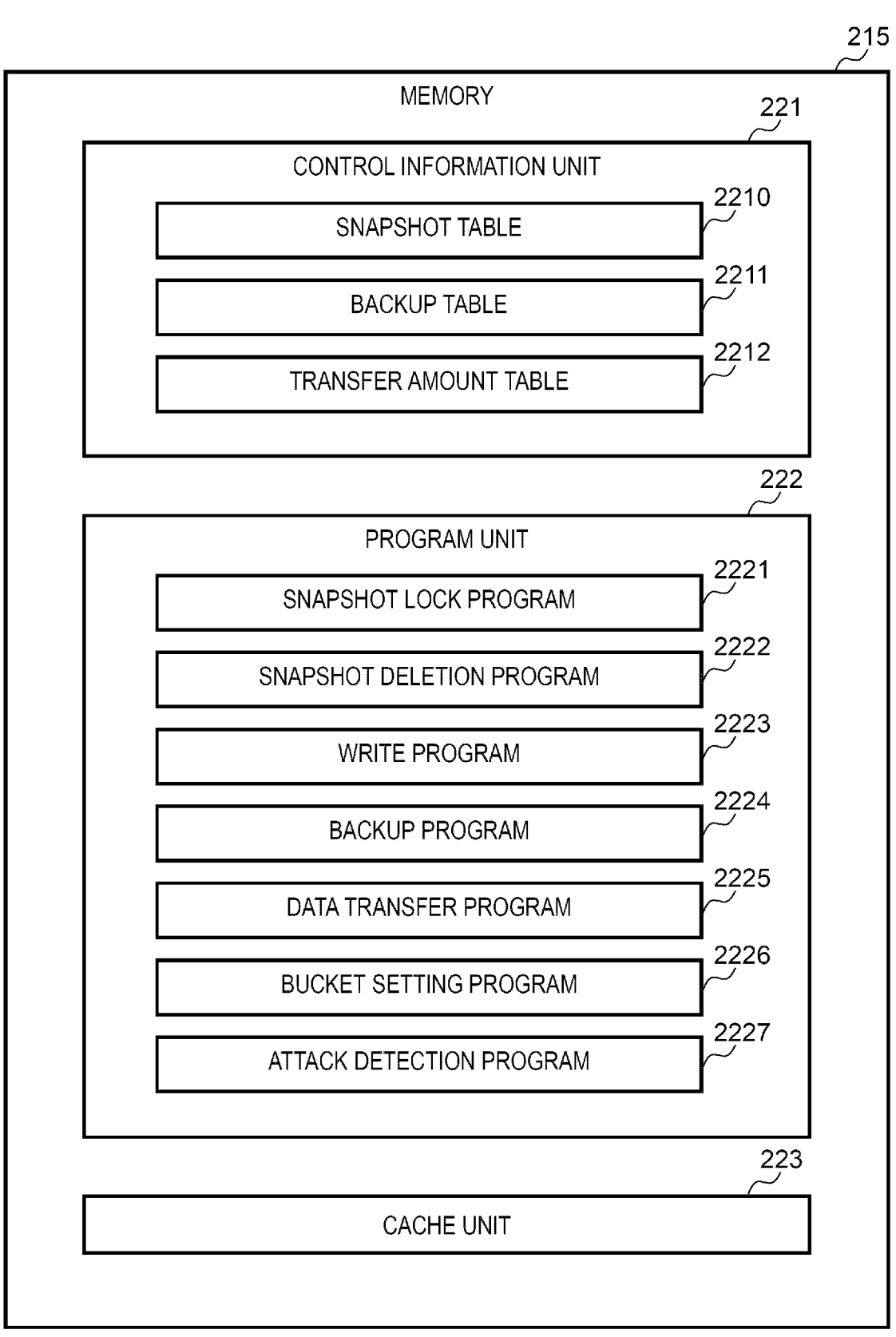
FIG. 3 is a diagram illustrating an example of information stored in a memory of the storage.

FIG. 3 is a diagram illustrating an example of the information stored in the memory 215 of the storage 200. As illustrated in FIG. 3, the memory 215 stores control information 221 and a program 222 as information related to snapshot processing and backup processing. The memory 215 includes a cache unit 223 that temporarily stores data.

The control information 221 includes a snapshot table 2210, a backup table 2211, and a transfer amount table 2212. Details of these tables will be described later. The program 222 includes a snapshot lock program 2221, a snapshot deletion program 2222, a write program 2223, a backup program 2224, a data transfer program 2225, a bucket setting program 2226, and an attack detection program 2227.

The programs illustrated in FIG. 3 relate to the present embodiment. Actually, another program may be included. For example, there is a read program for reading data from the volume 217.

Figure 4:
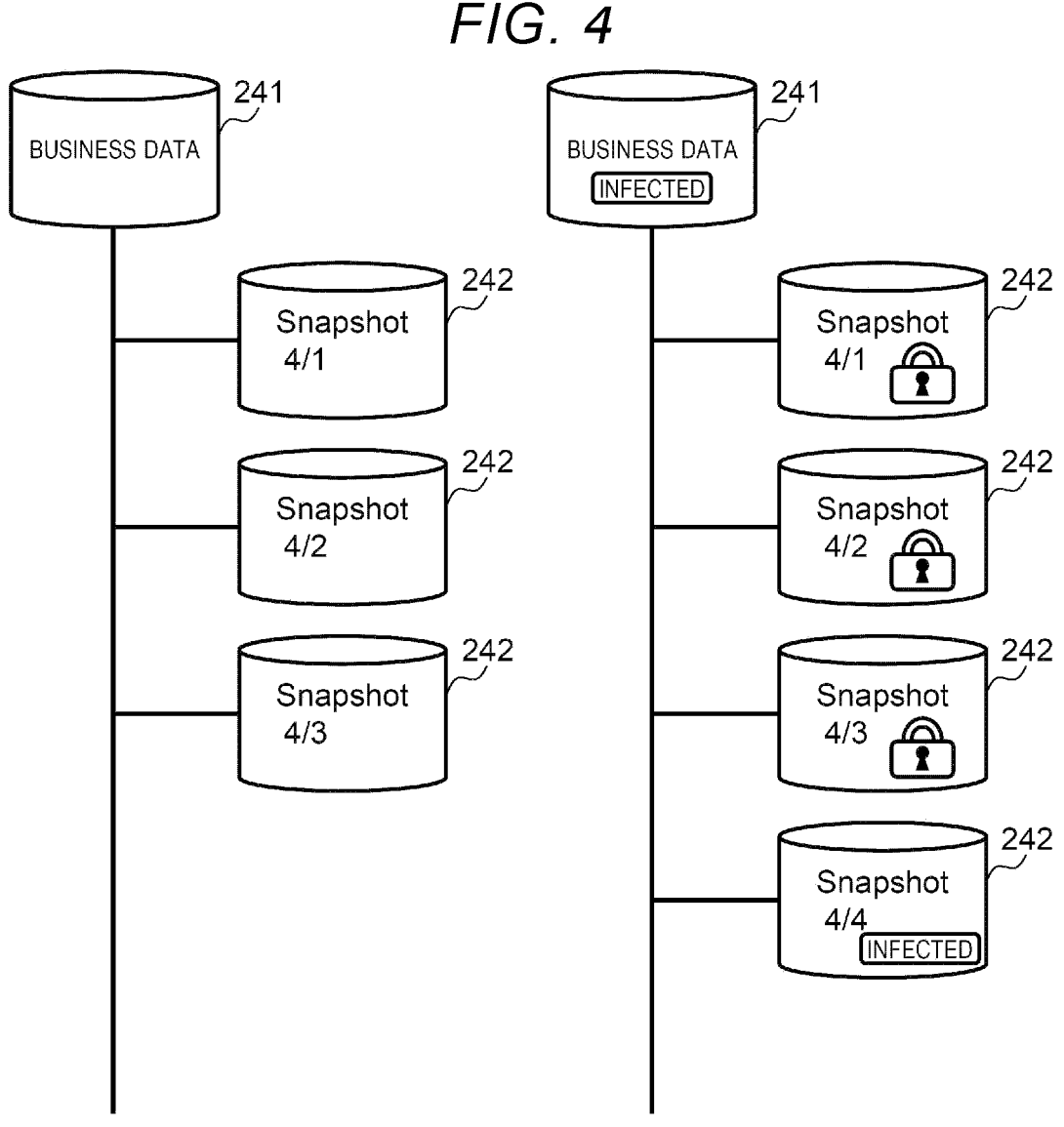
FIG. 4 is a diagram illustrating snapshots and an outline of protection of snapshots.

FIG. 4 is a diagram illustrating an outline of the invention. As a method for implementing data recovery after receiving a cyber attack, there is a method of creating a backup of data and recovering data from backup data. A backup of data using a snapshot function can be created in a storage.

A snapshot is a logical copy, at a certain moment, of a volume in which user data is stored. Creation of a snapshot is completed in a short period of time without requiring to copy a user data entity.

The snapshot points to data stored in the volume 241 to create a logical copy. The pointer information is referred to as metadata. When data is written to the volume 241 after creating a snapshot, the data is stored in another physical address and metadata of the volume 241 is updated to the other physical address. The same applies to a case where data is written to a snapshot 242. Accordingly, the data of the volume 241 and the snapshot 242 can be correctly stored.

By using a snapshot, it is possible to protect data from a cyber attack on business data. When business data is attacked and cannot be used for business processing, data can be recovered by writing back (hereinafter referred to as restore) data of the snapshot to the volume 241.

However, when a cyber attack is performed on a snapshot, normal data before the attack cannot be restored to the volume 241. For example, as an example of the attack, writing of data to a snapshot, deletion of a snapshot, and the like are considered. The writing of data includes encrypting data of a snapshot.

Therefore, a protection function (lock function) against a snapshot is required. Lock means prohibition of deletion or change of physical data. The lock function is a function of prohibiting access (writing and reading) to a snapshot and a function of prohibiting snapshot deletion. The lock function may be a function of permitting only reading of data. A lock period in which access is prohibited or a snapshot is prohibited may be set. For example, access prohibition, deletion prohibition, and the like are performed for one month. An administrator who plays a specific role may be allowed to access or delete a snapshot. When the lock period passes, the lock is released, and it is possible to access a snapshot or delete a snapshot.

As the lock period, a finite period is set. However, in a case where a long period is set, even when a snapshot becomes unnecessary, the snapshot cannot be deleted and unnecessary data continues to be stored. In such a cyber attack, it is conceivable to acquire the snapshot 242 with high frequency in order to recover with the latest data at the time of recovery. Therefore, it is hardly conceivable to set an extremely long period.

When the volume 241 is infected with the Ransomware due to a cyber attack, data of a snapshot created after the Ransomware attack is also infected. The illustrated example illustrates a state in which the snapshot 242 created on April 4 is infected.

In this case, it is necessary to restore snapshots before April 3. On the other hand, after elapse of time, the snapshots before April 3 may not be locked, or may be unlocked because of passing of a lock time limit in the future.

In the present invention, upon detecting a cyber attack, lock is set, or lock of which a lock time limit is close is extended. In the following description, data that may be infected with Ransomware, infected with another virus, or encrypted by Ransomware is collectively referred to as attacked data. Data that is not attacked is referred to as normal data.

Figure 5:
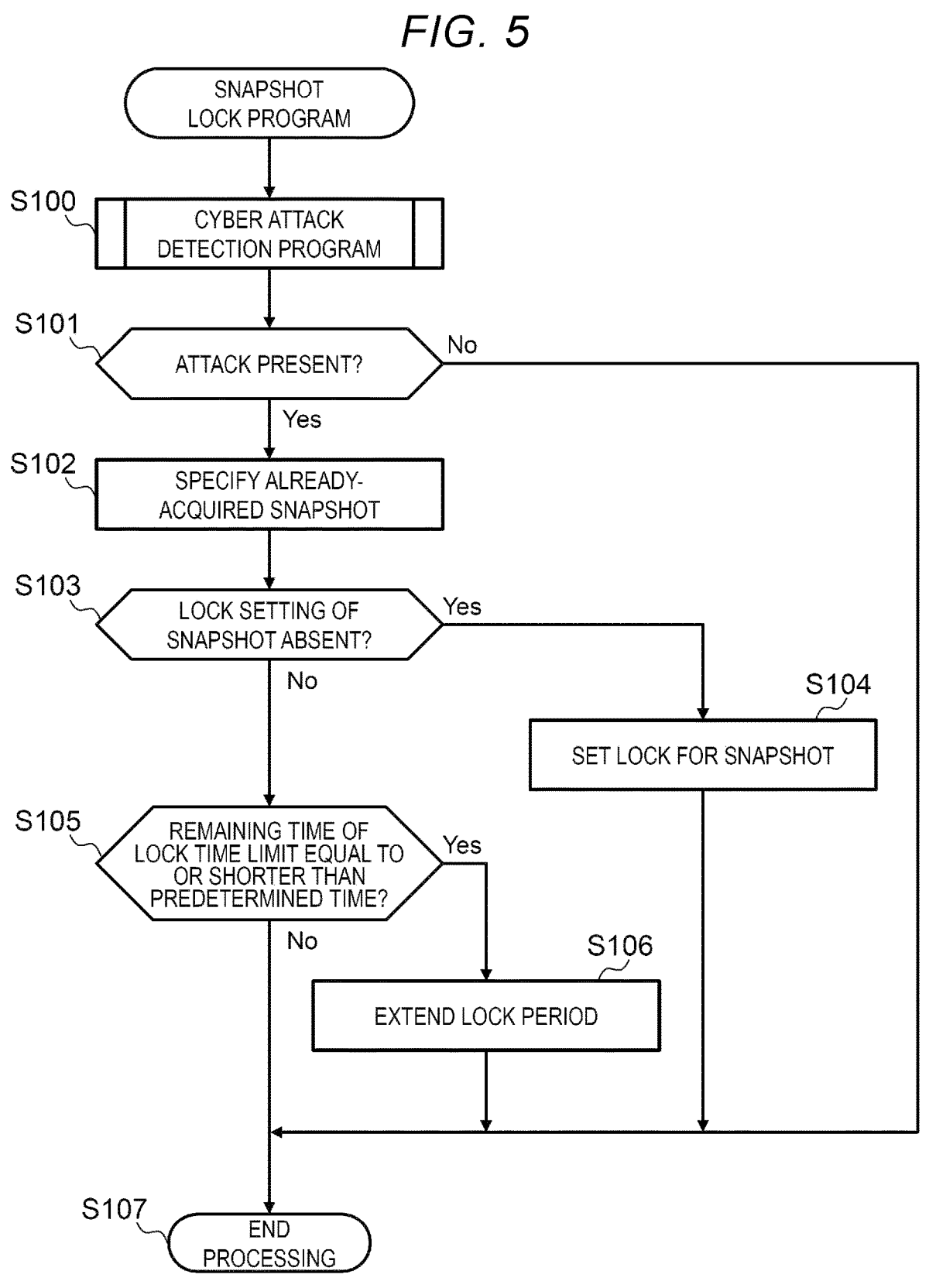

FIG. 5 is a diagram illustrating an example of processing of the snapshot lock program 2221. The snapshot lock program 2221 is a program that, upon detecting a cyber attack, identifies a snapshot that needs to be locked, and sets lock, or extends a lock period.

The snapshot lock program 2221 may operate on the storage 200, the management terminal 270, or the external management software 410.

Several methods of detecting a cyber attack are known techniques. There is known a technique of learning an IO to a storage, a data compression ratio in a storage, and the like, and detecting an attack from a change in the IO, the data compression ratio, and the like. When an attack is detected by these functions, processing of step S101 and subsequent steps is executed to lock a snapshot.

Detection of a cyber attack does not need to be detection of a cyber attack on a storage. When an attack on a network, a server, middleware, an application, or the like is detected, the processing of step S101 and subsequent steps may be executed.

The snapshot lock program 2221 executes a cyber attack detection program to determine presence or absence of an attack (step S100).

When there is no attack, the processing ends (step S107).

When there is an attack, the snapshot lock program 2221 identifies an already-acquired snapshot (step S102). This processing can be implemented by referring to a snapshot table of the storage 200.

Next, the snapshot lock program 2221 determines presence or absence of lock of the snapshot (step S103), and instructs lock for a target snapshot when the snapshot is not locked (step S104). This processing is implemented by storing information of snapshot lock setting, a snapshot lock period, and an access mode in the snapshot table. On the other hand, when the snapshot is locked, the processing proceeds to step S105.

In step S105, the snapshot lock program 2221 determines whether a remaining time of the set lock is equal to or more than a certain time (step S105). This can be implemented by referring to the information of the snapshot lock period in the snapshot table.

When the remaining time is equal to or less than the certain time, the snapshot lock program 2221 instructs extension of the lock period (step S106). This processing is implemented by changing a value of the snapshot lock period in the snapshot table 2210. On the other hand, when the remaining time is equal to or more than the certain time, the processing proceeds to step S107 and ends (step S107).

The snapshot lock program 2221 can operate on the management terminal 270, the external management software 410, or the storage 200. When the snapshot lock program 2221 operates on the management terminal 270 and the external management software 410, the processing of steps S102, S104, and S106 acquires and updates the information of the snapshot table 2210 through a program operating on the storage 200.

This program is periodically executed. The snapshot lock program 2221 may be called from the cyber attack detection program.

In the above description, the processing of step S102 and subsequent steps is executed for a snapshot. In a case where the lock period is set in a group unit in which a plurality of snapshots are collected, the processing of step S102 and subsequent steps may be executed in a group unit.

When it is possible for the detection on a cyber attack to detect an attack on a specific volume, the processing of step S102 and subsequent steps may be performed on a snapshot on the volume. The processing of step S102 and subsequent steps may be preferentially executed for the volume that is attacked. The processing of S102 to S107 may be executed for the volume 241 designated in advance by the user.

Since there is a possibility that a snapshot created after detecting a cyber attack is attacked, a fact that there is a possibility that a snapshot is attacked may be managed in the snapshot table 2210, and a fact that there is a possibility that a snapshot is attacked may be displayed by management software or the like.

Figure 6:
FIG. 6 is a diagram illustrating an example of a snapshot table.

FIG. 6 is a diagram illustrating an example of the snapshot table 2210.

In FIG. 6, the snapshot table 2210 is information for managing information related to snapshots created for volumes. The snapshot table 2210 holds information of consistency group number, volume number, snapshot number, snapshot lock setting, snapshot lock period, and access mode.

The volume number is a volume number for identifying the volume 217, which is a target of snapshot creation.

The snapshot number is a number for identifying a snapshot created for the volume identified by the volume number.

A plurality of snapshots may be acquired for one snapshot. A snapshot can also be acquired, with a snapshot as a target, by managing the snapshot as a volume and assigning a volume number.

The snapshot lock setting is information indicating whether lock is set for the snapshot identified by the snapshot number. When "ON" is set, lock is set, and deletion of a snapshot is prohibited. Access to a snapshot is performed in accordance with the access mode.

The snapshot lock period is information indicating an end date and time of lock when lock is set for a snapshot.

The access mode manages a type of access that can be executed for a target snapshot. Values such as prohibition of reading, prohibition of writing, prohibition of reading and writing, and permission of reading and writing may be stored.

In the illustrated example, a snapshot 1 indicates that lock is set until 15:00 on April 25, reading is executable, and writing is not executable.

The consistency group number is information associated to manage a plurality of volumes as one group. By using a consistency group, when one application uses a plurality of volumes, it is possible to collectively acquire snapshots of the same date and time for the plurality of volumes. In the illustrated example, a volume 1-1 and a volume 1-2 belong to a consistency group 1.

The snapshot table 2210 may include information other than the information illustrated in FIG. 6. For example, information such as a creation time of a snapshot may be included.

By storing a finite value in the snapshot lock period, it may be determined that lock of the snapshot is set. In this case, a value of the snapshot lock setting may become unnecessary.

Figure 7:
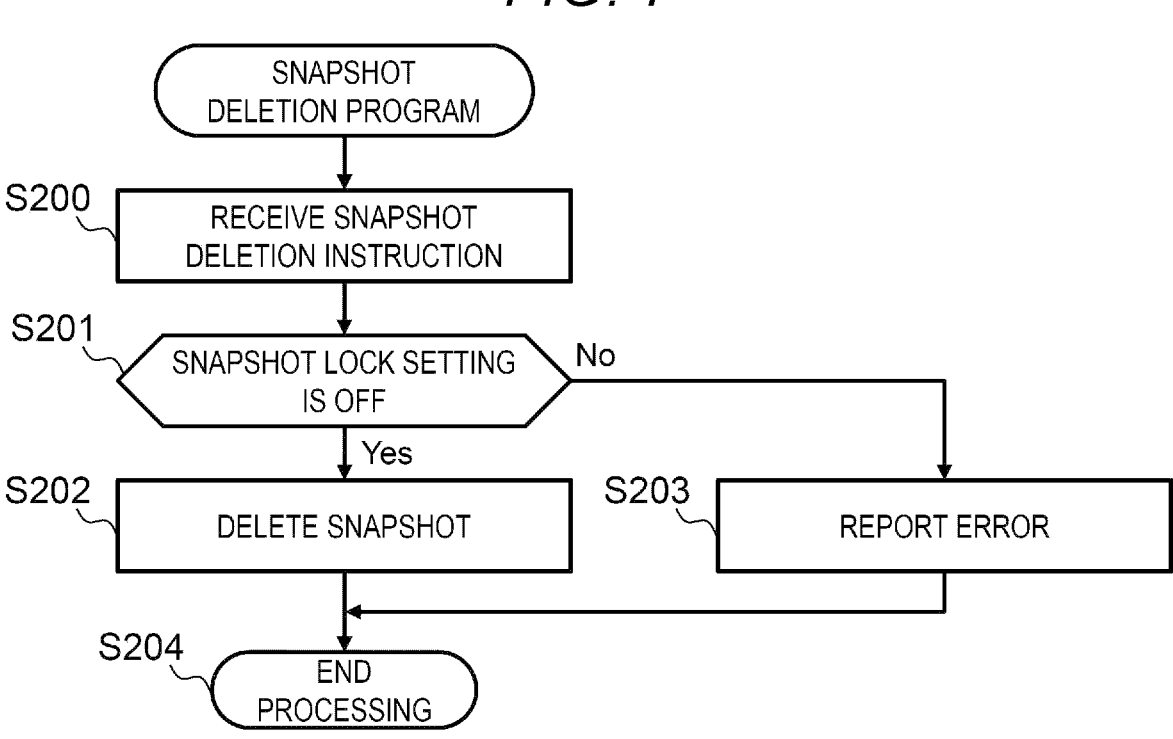
FIG. 7 is a flowchart illustrating an example of snapshot deletion processing.

FIG. 7 is a diagram illustrating an example of processing of the snapshot deletion program 2222 for deleting a snapshot.

The snapshot deletion program 2222 operates on the storage 200 and deletes a snapshot by updating the snapshot table 2210.

The snapshot deletion program 2222 receives a snapshot deletion instruction via the management terminal 270 or the external management software 410 (step S200).

The snapshot deletion program 2222 checks the snapshot lock setting to determine whether lock is already set for a snapshot (step S201).

When lock is already set for a snapshot, that is, when the value of the snapshot lock setting is ON, an error is reported in step S203, and the processing ends (step S204).

On the other hand, when lock is not set for a snapshot, that is, when the value of the snapshot lock setting is OFF, the snapshot is deleted in step S202, and the processing ends (step S204).

Since snapshot deletion processing is general processing, a detailed description thereof will be omitted in the flowchart of FIG. 7. A snapshot can be deleted by deleting snapshot information, which is a deletion target, from the snapshot table 2210 and deleting data referred to only from the snapshot. Deletion of data may be executed asynchronously.

Figure 8:
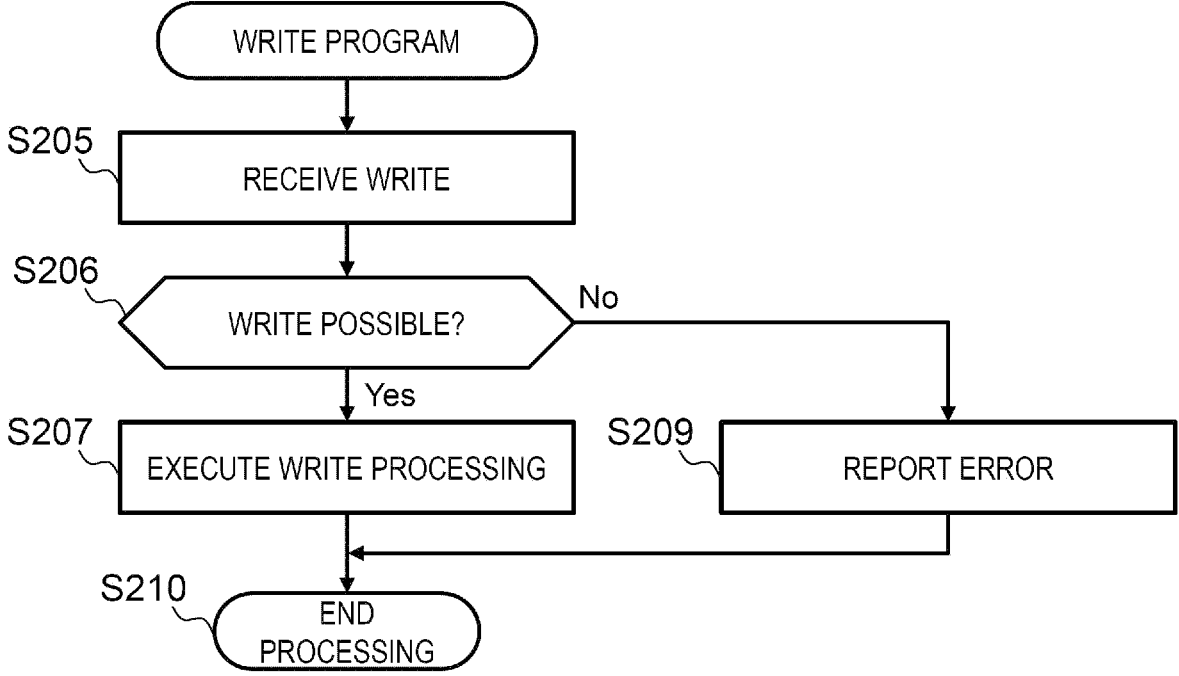
FIG. 8 is a flowchart illustrating an example of write processing.

FIG. 8 is a diagram illustrating an example of processing of the write program 2223 in which a write request from the server 100 is received and write data is stored in a volume.

The write program 2223 operates on the storage 200.

The write program 2223 receives a write request from the server 100 (step S205).

The write program 2223 checks the snapshot lock setting to determine whether lock is already set for a snapshot (step S206).

When writing is impossible, that is, when "WR" is not included in the value of the access mode, an error is reported in step S209, and the processing ends (step S210).

On the other hand, when writing is possible, that is, when "WR" is included in the value of the access mode, write processing is executed in step S207, and the processing ends (step S210).

According to the above processing, the backup data acquired in the storage 200 can be prevented from a cyber attack or an attack from a malicious administrator.

Next, a case where backup data is acquired not in the storage 200 but in an external storage will be described. The object storage 400 will be described as an example of the external storage, but another storage may be used.

Figure 9:
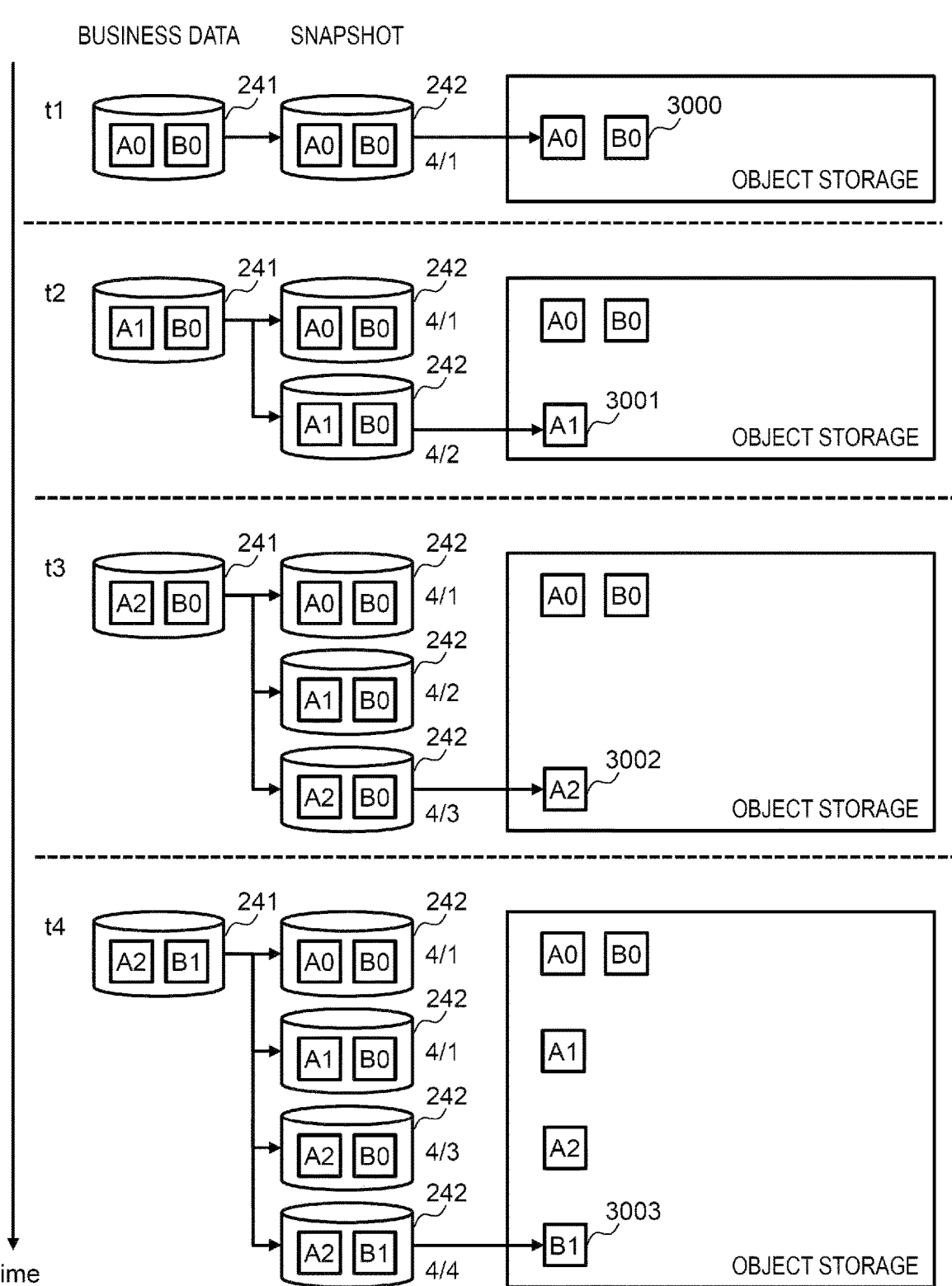
FIG. 9 is a diagram illustrating an outline of backup processing.

FIG. 9 is a diagram illustrating a flow of processing for acquiring a backup to the object storage 400.

There are a plurality of types of transfer methods for transferring backup data to the object storage 400. Examples of the transfer method include incremental backup, differential backup, and remote copy. The incremental backup and the differential backup are methods of periodically transferring backup data. The incremental backup is a method of transferring update data updated after a time point of the previous transfer of the backup data as next backup data, and the differential backup is a method of transferring differential data with backup data transferred first as the backup data. The remote copy is a method of reflecting the update of the volume 241 in the object storage 400. The remote copy includes a method of sequentially transferring data every time the data is written to the volume 241 and a method of periodically collectively transferring written data. In the method of periodically transferring data, when data is updated a plurality of times for the same address, only the last updated data may be transferred. In the present embodiment, the transfer method is incremental backup. The technique of the present embodiment can be applied to differential backup by changing a snapshot to be used at the time of retrieving differential data to be described later to a snapshot to be acquired this time and a snapshot corresponding to backup data transferred first.

In the incremental backup, a snapshot of data stored in the storage 200 (more specifically, data stored in the volume 241, which is a protection target, among data stored in the storage 200) is periodically (in the example of FIG. 9, every day) created and transferred to the object storage 400.

For example, at a time point of April 1 which is a first transfer timing, the data stored in the volume 241 is transferred as an object 3000 to the object storage 400 and stored therein. In general, a ratio of the number of the volume 241 to the number of the object 3000 is 1:N (integer of 2 or more), but may be 1:1 or the like.

At a time point of April 2, which is a next transfer timing, a snapshot holds only differential data generated between April 1 and April 2, and the snapshot is transferred to the object storage 400 and stored therein. In the example of FIG. 9, data A0 is updated to data A1 between April 1 and April 2. Therefore, A1 is transferred to the object storage 400 as a difference. The differential data is retrieved by retrieving write destination addresses (storage addresses of A0 and A1) generated between April 1 and April 2, and reading data of the addresses from the snapshot of April 2. Similarly, at a time point of April 3, which is a further next transfer timing, a snapshot holds only differential data generated between April 2 and April 3, and the snapshot is transferred to the object storage 400 and stored therein.

A generation frequency of generating a snapshot and a transfer frequency of transferring a snapshot to the object storage 400 may be different from each other. For example, a snapshot that is not referred to in the storage 200 for a certain period of time may be transferred to the object storage 400. Transfer of data same as the data stored in the object storage 400 may be avoided. In this case, management information indicating the same data may be transferred, instead of transferring data. In this case, an amount of data to be transferred and an amount of data stored in the object storage 400 may be reduced.

An object storage is the object storage 400 provided by the cloud 2 in FIG. 1, and may be an appliance type object storage. For example, the object storage may be an object storage installed in the data center 1 or may be an object storage installed in another data center.

Each object may be compressed to reduce the amount of data. The object may be compressed when being transferred from the storage 200, or may be compressed in the object storage 400. In a case where the object is compressed when being transferred from the storage 200, it is possible to reduce a transfer amount of a network in addition to a storage amount of the object storage 400.

Next, problems caused by a cyber attack will be described.

Problem 1: There is a possibility that the snapshot of April 3 is attacked while a difference between the snapshots of April 3 and April 2 is retrieved and transferred to the object storage. For example, it is an attack such as rewriting data. In this case, attacked data is also stored in the object storage 400. In order to protect data from such an attack, the snapshot of April 3 is locked until transfer of an object 3002 is ended. Snapshot deletion prohibition and write prohibition are set. Since it is necessary to read data for transfer to the object storage 400, reading is permitted.

Problem 2: Next, considering a case in which the snapshot of April 2 is attacked at the time of transferring a backup of April 3. For example, when all the data of April 2 is rewritten, data of all addresses is retrieved as a difference in a case where the differential data of April 3 and April 2 is retrieved. A reason is that all the data of April 2 is rewritten to be different from the data of April 3. In this case, it is necessary to transfer excess data, which is originally unnecessary to be transferred, to the object storage 400. In the illustrated example, when B0 of the snapshot of April 2 is rewritten to B5, an address of B0 is also retrieved as a difference in the transfer of data of April 3, and B0 is also transferred to the object storage. Although the data itself is not inconsistent, a capacity of the object storage is consumed. In the case of a cloud, when charging is incurred in accordance with a storage capacity, extra cost is incurred. In order to protect data from such an attack, it can be seen that it is desirable to lock the snapshot of April 2 even in transfer of the data of April 3. However, since the lock for April 2 is not essential, only the snapshot of April 3 may be locked, and the snapshot of April 2 may not be locked. A reason is that although the amount of data to be transferred to the object storage increases even after the attack described above, normal data among data itself can be transferred to the object storage.

Problem 3: An attack on the object storage 400 is considered as problem 3. An object stored in the object storage 400 may be rewritten by a cyber attack or deleted. When such an attack is received, correct data cannot be recovered from the object storage 400. In order to protect data from such an attack, it is necessary to lock the object itself stored in the object storage 400. Lock of an object applies a lock function provided by an object storage product or an object storage service of a public cloud. Basically, it is possible to avoid loss of normal data by deletion or update of an object. The lock period can be set similarly to the lock of snapshots. Further, a function of extending the set lock period is provided.

A method for avoiding these problems will be described with reference to the following drawings.

Figure 10:
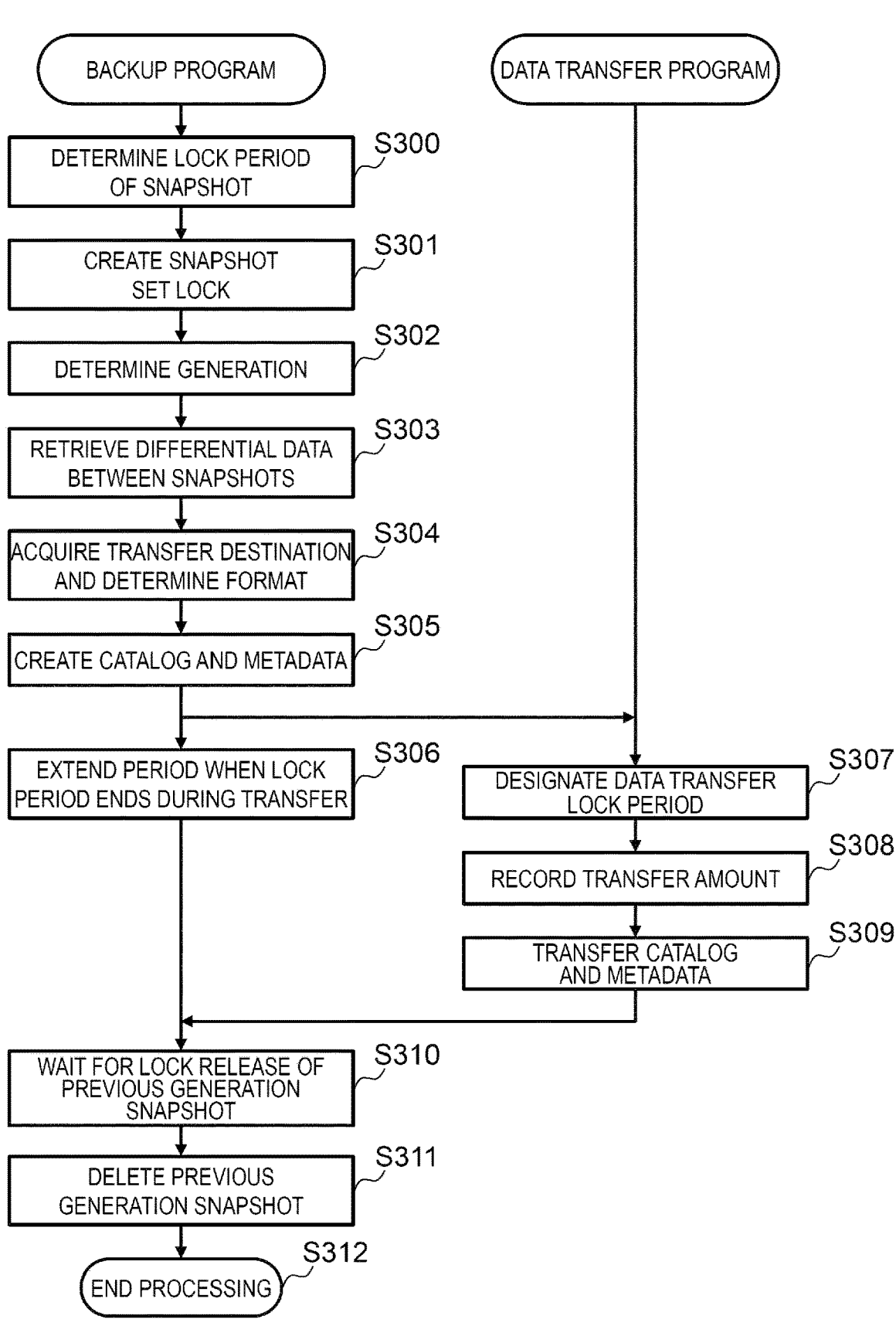
FIG. 10 is a flowchart illustrating an example of backup processing.

FIG. 10 is an example of processing illustrating an example of backup processing to an object storage. The processing avoids the above-described problems 1, 2, and 3 by locking an object that locks a snapshot created in the storage 200 and that is stored in the object storage 400. The processing is implemented by the backup program 2224 and the data transfer program 2225. These programs operate on the storage 200.

The backup program 2224 determines a lock period at a creation timing of a snapshot (step S300). Lock of a snapshot is lock for solving the above-described problems 1 and 2. When it is desired to solve only the problem 1, only lock of a snapshot created in step S301 this time may be created. In the lock period, the snapshot may be locked during execution of steps S301 to S309. Most of time of steps S301 to S309 is data transfer time of step S307. The data transfer time depends on an amount of differential data to be transferred. The lock period can be determined by estimating the amount of the differential data to b transferred. The amount of the differential data to be transferred can be estimated from an amount of differential data between the volume 241 and the previous snapshot 242. Description will be given with reference to the example in FIG. 9. In a case where a snapshot to be created this time is April 3, it can be seen that when a difference between the volume 241 and the snapshot of April 2 is retrieved before creating the snapshot of April 3, the differential data is A2. The differential data substantially matches the snapshot of April 3 and the snapshot of April 2. When a differential amount is known, the transfer time can be calculated from an actual result of transfer performance of the object storage 400 from the storage 200. The lock period of the snapshot of April 3 can also be determined by the following method. The snapshot of April 3 is created. At this time, a time sufficient for calculating the differential amount such as 10 minutes is set as the lock period. The difference between the created snapshot of April 3 and the previous snapshot of April 2 is retrieved to calculate the transfer time. Thereafter, the lock period of the snapshot of April 3 is extended using the calculated transfer time. Alternatively, the lock period may be simply determined from an actual result of the past transfer time. For example, in a case of daily backup, the actual result is an actual result that the transfer time falls within 5 hours. The actual result may be managed and applied for each day of the week.

Next, when it is desired to solve the problem 2 or to solve the problems 1 and 2, it is necessary to lock both a snapshot created in the current step S301 and a snapshot created in the previous step S301. That is, the snapshot created in the current step S301 needs to be continuously locked until a snapshot is created next. The lock period is calculated from an acquisition frequency of a backup stored in a backup table to be described later. In the example of FIG. 9, the backup is acquired once a day. That is, the snapshot used in the backup processing is also created once a day. Therefore, it can be seen that in the case of the example of FIG. 9, the lock period of the snapshot created in step S301 may be set to one day. In consideration of a delay of snapshot creation, a delay of backup acquisition schedule, and the like, one day+ several hours to one day obtained by adding several hours to one day may be set as the lock period.

After determining the lock period, the backup program creates a snapshot for each volume 241, which is a protection target (step S301). At this time, snapshot lock is set in the lock period determined in step S300. Accordingly, the above problems can be avoided, and normal data can be stored in an object storage.

The backup program 2224 determines a generation number of the current snapshot acquired in step S300 (step S302). For example, when the generation number is a serial number, the backup program 2224 increments a previous generation number to determine a current generation number.

The backup program 2224 retrieves a difference between a previous snapshot and a current snapshot (step S303). Retrieving of the difference can be implemented by, for example, holding a write address of data written to the main volume 217 after acquisition of the snapshot or comparing snapshot metadata of the previous snapshot and the current snapshot. The snapshot metadata is information indicating an address where snapshot data is physically stored. When the snapshot metadata is the same as the data of the volume, which is a protection target, it is possible to reduce capacity consumption due to a snapshot by storing an address indicating a physical location where the data of the volume, which is a protection target, is stored.

The previous snapshot indicates the snapshot created in step S301 of the backup program previously executed. There is a possibility that a function other than the backup processing to the object storage 400 acquires a snapshot for the volume 241. When such a case is considered, the snapshot created in step S301 of the backup program previously executed can be specified by storing creation source information of the snapshot in the snapshot table 2210.

The backup program 2224 refers to the backup table 2211, specifies the cloud 2 and a bucket as the transfer destination of the backup data which is the difference of the snapshots, and further determines a format which is the data transfer method (step S304). For example, the backup program 2224 determines, as the format, which data is collectively set as one object in accordance with an upper limit value of an object size.

The backup program 2224 creates a catalog, which is management information for managing the backup processing, and metadata for managing the backup data (step S305). The catalog and the metadata will be described later in more detail with reference to FIG. 11.

Thereafter, the data transfer program 2225 transfers the backup data as an object to the object storage 400 of the cloud 2 in accordance with the format determined in step S304 (step S307). At this time, the data transfer program 2225 designates lock of the object to be transferred. A period of lock designates a lock period stored in a backup table to be described later. At this time, the data transfer program 2225 may appropriately perform processing related to transfer of backup data such as processing of adding a header of an object.

Next, the data transfer program 2225 records a transfer amount table transferred to an object storage (step S308). Although details of the transfer amount table are omitted, the transfer amount table is a table that manages a history of transfer data amounts transferred so far for each transfer destination bucket. Subsequently, the data transfer program 2225 transfers the catalog and the metadata created in step S305 (step S309). For example, the data transfer program 2225 may transfer the catalog and the metadata as objects to the object storage 400, or may transfer the catalog and the metadata to another storage unit such as a database on the cloud 2. The catalog and the metadata may be stored as information in an object key of the objects. For example, when the number of the volume, which is a protection target, is used as an object key name, it is unnecessary to store the number of the volume, which is a protection target, in the object.

The backup program 2224 that requests the data transfer program 2225 to transfer the data monitors so that the lock set for the snapshot does not exceed a time limit during data transfer, and extends the lock period when a certain time or less is reached until the lock time limit is exceeded (step S306). Accordingly, even when transfer of the backup data is delayed due to a large differential amount, a network trouble, or the like, the snapshot can be continuously locked.

After the processing of the data transfer program 2225 is completed, the backup program 2224 waits for lock release of the previous snapshot in the storage 200 (step S310), deletes the previous generation snapshot (step S311) when the lock is released, and ends the processing (step S312). The current snapshot is used in step S303 of the next backup processing, and thus is not deleted. In the example of FIG. 10, the backup program 2224 waits for lock release and deletes the previous generation snapshot, but another program may delete the previous snapshot at another timing.

It is unnecessary to delete all snapshots up to the previous snapshot. In a case where a snapshot is left in the storage 200, the capacity consumed in the storage 200 increases, but the time required for restoring data can be reduced. For example, at the time of restoring a snapshot acquired at 11:00 from the cloud 2, when there is a snapshot at 9:00 in the storage 200, a difference from 9:00 to 11:00 is acquired from the cloud 2. On the other hand, when there is a snapshot at 10:00 in the storage 200, only a difference from 10:00 to 11:00 may be acquired from the cloud 2, the data transfer amount can be reduced, and the time required for restoration can be reduced. In addition, the processing of transferring data of the storage 200 is described using an example in which the processing is executed by the program stored in the memory 215. However, the RC I/F 214 may become a main component and transfer data stored in the volume to the cloud 2. In this case, the backup table 2211 may be stored in a memory in the RC I/F or may acquire information from a table stored in the memory of the storage 200. Sharing other than the role sharing may be considered, and the present invention may be applied without depending on the method.

Although the lock is designated in step S307, when lock is set for a transfer destination bucket itself, lock designation in step S307 may be omitted. When a lock period designated in step S307 is longer than a lock period set for the transfer destination bucket, the lock may be designated in step S307. In this case, information indicating whether the bucket is already locked is held in the backup table. It is assumed to notify that lock is set to update the backup table of the storage 200 after a bucket setting program sets lock for a bucket.

A step of checking whether the two snapshots 242 used in step S303 are locked may be added immediately before step S303. When the snapshots used in step S303 are not locked, an alert may be issued. When the snapshots are not locked, information on whether a snapshot used for backup is locked is added to the backup data stored in steps S307 to S309 and stored therein. Information indicating a lock state of a snapshot used for backup is stored in backup information 1001 to be described later. When a snapshot is locked, "locked" is stored, and when a snapshot is not locked, "not locked" is stored.

A snapshot may be locked in step S301, and data transferred to an object storage may not be locked in step S307. In this case, an attack on the object storage cannot be avoided, but an attack on the snapshot can be avoided. That is, the security level is improved as compared with the related art. Conversely, lock of a snapshot in step S301 may be not performed, and only lock of data transferred to an object storage in step S307 may be performed. A user may set whether to execute lock of the data transferred to the object storage for each volume or consistency group.

On the other hand, the lock of the data transferred to the object storage in step S307 may be executed, and the lock in step S301 may be not performed. In addition, a user may set whether to execute lock of a snapshot for each volume or consistency group. In the above manner, the problems 1, 2, and 3 can be avoided.

FIG. 11 is a diagram illustrating an example of objects stored in the object storage 400 and data stored in the objects.

In the example of FIG. 11, there are four types of objects including a catalog 1000, the backup information 1001, differential information 1002, and data 1003. Each object may be divided into a plurality of objects and stored. The object configuration is merely an example, and may be implemented by other storage methods and object keys. The present invention may be applied to any object configuration. The object key is information designated to retrieve an object.

The catalog 1000 illustrated in FIG. 11 includes a volume number, a storage number, and acquired generation information. The volume number is an identification number for identifying the volume 241, which is a protection target. The storage number is an identification number for identifying a storage device having the volume 241, which is a protection target. The acquired generation information is information for managing generation information of a backup acquired for the volume number and stored in the object storage 400. The catalog 1000 is updated every time the backup is acquired by the object storage 400. An object key for accessing the catalog 1000 may be a volume number or the like. By designating the volume number, the generation information of the backup acquired for the volume can be acquired.

Next, the backup information 1001 includes a generation number, a volume number, a storage number, a time, and a type.

The generation number is a generation number of a backup. The time is a time when a current backup is acquired. The type is a type of backup processing, and indicates, for example, "full backup", "incremental backup", or "differential backup". An object key for accessing the backup information 1001 may be volume number+generation number or the like. The generation number is acquired by accessing the catalog 1000. Information indicating the lock state indicating whether backup data of the backup generation identified by the generation number is acquired with the lock of the snapshot 242 or acquired without the lock may be stored.

Next, the differential information 1002 includes differential data presence/absence information. The differential information 1002 includes information illustrated in FIG. 11 for each backup generation of a backup target volume. An object key for accessing the differential information 1002 may be information indicating volume number+generation number+differential information acquisition request. The differential data presence/absence information stores information indicating presence/absence of differential information for each address of the backup target volume. The "differential data presence/absence information (address 0)" in FIG. 11 indicates whether data of an address 0 of the backup target volume is included in the data 1003 to be described later. For example, it can be managed by 1-bit information. When the bit is 1, it indicates that data is stored, and when the bit is 0, it indicates that data is not stored.

Finally, the data 1003 includes data. The data includes backup data itself. For example, in the differential information 1002, differential data of an address indicating presence of the differential data is left-justified and stored. When information indicating presence of a difference among the addresses 0, 2, and 3 is stored in the differential information 1002, data stored in the addresses 0, 2, and 3 is left-justified and stored in the data 1003. By comparing the information of the differential information 1002 with the data 1003, the data of each address of the backup target volume can be retrieved. The address is, for example, a logical block addressing (LBA). An object key for accessing the data information 1003 may be information indicating volume number+generation number+data acquisition request.

The catalog information 1000 and the backup information 1001 illustrated in FIG. 11 may be provided to a user as information of backup data using the external management software 410 or the management terminal 270.

Figure 12:
FIG. 12 is a diagram illustrating an example of a backup table.

FIG. 12 is a diagram illustrating an example of the backup table 2211.

In FIG. 12, a backup table is information for managing a backup target volume, a backup destination, a backup schedule, and lock setting of backup data. The backup table holds information of a volume number, an object bucket, object lock setting, an acquisition frequency, a lock period, and a backup holding period.

The volume number records a backup target volume number.

The object bucket is information of an object storage that stores backup data.

The object lock setting is information indicating whether to set lock for an object constituting the backup data stored in the object bucket. ON means lock is set. OFF means that lock is not set.

The lock period manages a period during which an object is locked.

The acquisition frequency manages a frequency of acquiring a backup. Daily means that a backup is acquired once a day. A time of acquisition once a day may also be managed. The acquisition frequency may store a value input by management software from a user.

The backup holding period manages a period during which the acquired backup is stored. In the illustrated example, a backup is acquired every week for a volume 1-1. The acquired backups are stored in the object storage for four weeks. Further, it means that lock is set for four weeks to disable deletion and rewriting.

A value of the lock period may store a value input by the management software from the user or may be determined by the management software or the like. Information such as the backup holding period may be used for the determination. In addition, in order to determine the lock period, the lock period may be calculated from a backup holding number and the backup frequency. For example, input information is obtained from the user so that a backup is obtained once every week and ten backups are held. In this case, when the 11-th backup is acquired, the first backup becomes unnecessary. The first backup is required for ten weeks until the 11-th backup is acquired. Thus, ten weeks is set as the lock period. The acquisition frequency, the backup holding period, the backup holding number, and the like are referred to as schedule information of a backup.

Information on whether lock is set in units of buckets may be managed.

In the example of FIGS. 9 to 12, description of setting, for an object, lock of the object is given. A lock function of an object in a public cloud is capable of setting lock for a bucket which is an area stored with an object. In this case, lock may be set for a bucket. In addition, regarding a bucket, a default lock period of lock for an object stored in the bucket may be set.

As illustrated in FIG. 13, the bucket setting program 2226 is a program for setting lock in units of buckets for an object storage.

The bucket setting program 2226 operates on a management terminal or external management software. Although the bucket setting program 2226 may operate on the storage 200, the setting is mainly performed at the time of creating a bucket, and it is desirable to perform the setting by management software.

The bucket setting program 2226 acquires transfer destination bucket information (step S400). The processing can be implemented by acquiring a value of an object bucket of the backup table 2211.

Next, the bucket setting program 2226 sets lock for the acquired bucket (step S401). The shortest period among lock periods managed by the backup table 2211 may be set as a lock period of the bucket.

A lock period may be set for a bucket only when lock periods of all backup target volumes are the same lock period. In this manner, it is possible to avoid lock setting in units of objects, and it is possible to significantly reduce the number of times of communication with an object storage.

In FIG. 13, a lock period is set for an already-created bucket stored in the backup table. However, a lock period may be set when a bucket is newly created. For example, processing is performed in which a bucket is newly created, a lock period is set for the created bucket, the created bucket information and the set lock period are notified to the storage 200, and the object bucket and object lock information of the backup table are set.

A method of extending a lock period of a snapshot of the storage 200 after a cyber attack is detected has been described with reference to FIG. 5. Similarly, a lock period of an object transferred to the object storage 400 and stored therein can be extended.

Figure 14:
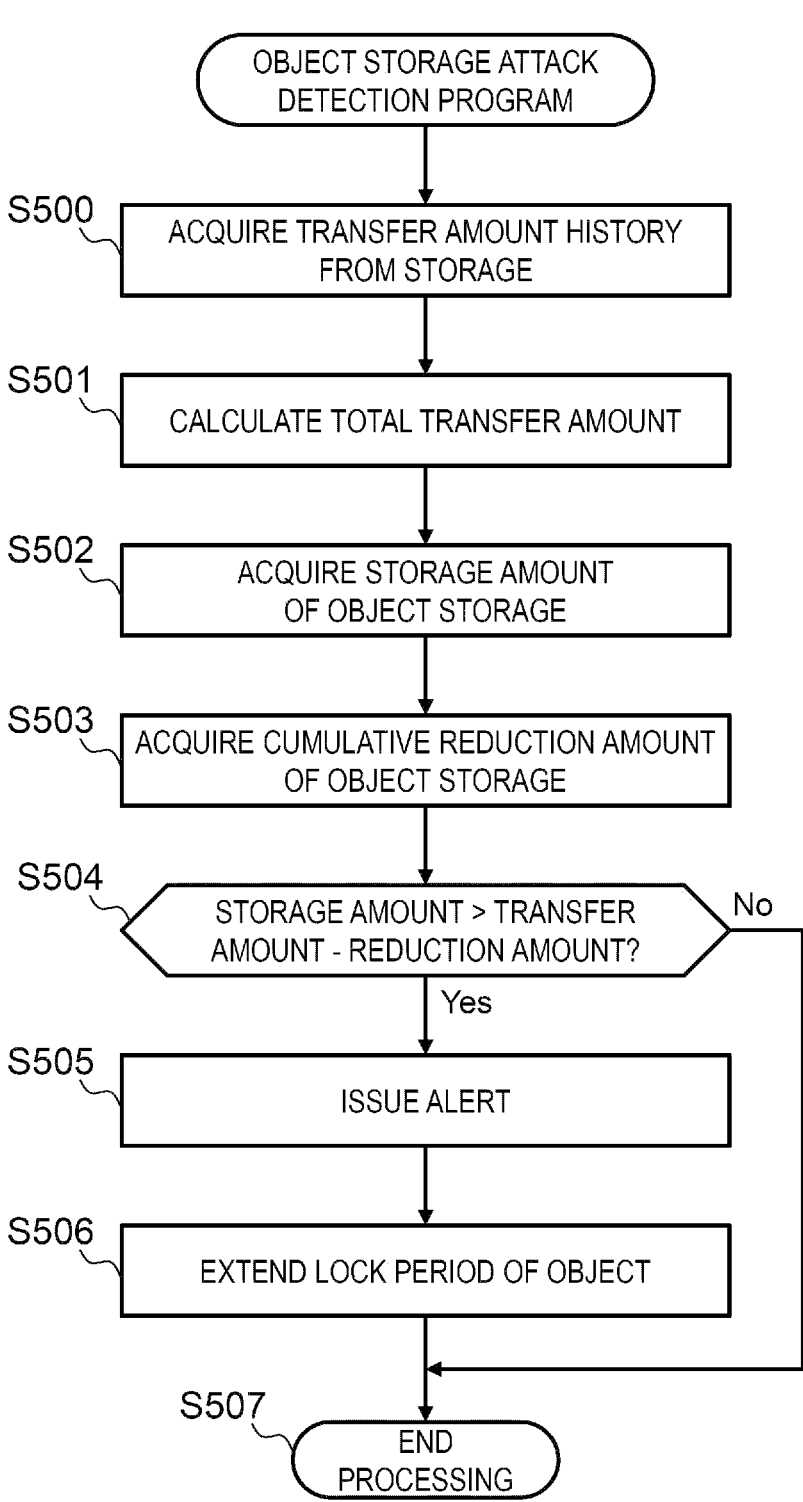
FIG. 14 is a flowchart illustrating an example of cyber attack detection processing.

FIG. 14 illustrates an example of a cyber attack detection method in a configuration in which backup data is stored in the object storage 400.

An object storage attack detection program is an example of a program for detecting a cyber attack on an object storage.

The object storage attack detection program acquires a transfer amount history from a storage (step S500), and calculates a total transfer amount (step S501). By the processing, an amount of data stored in an object storage is calculated in the backup processing.

Next, the object storage attack detection program accesses the object storage and acquires the amount of data stored in the object storage (step S502). Subsequently, the object storage attack detection program acquires a cumulative reduction amount of the object storage (step S503). The capacities acquired in steps S502 and S503 may be not in units of the object storage 400, but may be in units of buckets.

Next, the object storage attack detection program detects a cyber attack by comparing a storage amount (capacity stored in object storage) with a transfer amount (amount of data transferred to object storage by backup processing) (step S504).

In the object storage 400, a backup may be deleted by a user instruction. Therefore, specifically, a value obtained by subtracting the cumulative reduction amount from the transfer amount is compared with the storage amount. A calculation formula is storage amount>(transfer amount−cumulative reduction amount). When the storage amount is larger than (transfer amount−cumulative reduction amount), it can be determined that data is transferred to the object storage by processing other than the backup processing. That is, there is a possibility of a cyber attack.

In a case of Yes in step S504, that is, in a case where there is a possibility of a cyber attack, the object storage attack detection program transmits an alert (step S505) and extends a lock period of an object (step S506). By step S506, it is possible to prevent the lock period from ending and the lock from being released while receiving a cyber attack.

In a case of No in step S504, steps S505 and S506 are skipped, and the processing ends in step S507.

In step S506, it is unnecessary to extend lock of all objects. Only lock of an object for which a remaining time of the lock is less than a certain number may be extended.

In addition, when there are a plurality of generations of backups of a certain volume, only lock of an object of the latest generation may be extended. For example, when there are backup data of April 1, backup data of April 2, and backup data of April 3 of a volume, only lock of objects constituting the latest backup data of April 3 may be extended. In addition, a lock period of objects constituting a predetermined number of backup data from the latest backup generation may be extended.

In a case where there are a plurality of pieces of backup data (snapshots) acquired at different times for the same volume (storage area), when the latest backup data remains in a locked state, correct data may be recovered from the backup data. On the other hand, in a case where a plurality of pieces of locked data acquired at different times for the same volume (storage area) are continuously left, the data that becomes unnecessary cannot be deleted, and the capacity is wastefully used. Therefore, the lock period is set such that at least the locked latest backup data exists, that is, such that the lock period is longer than a backup interval and the number of the locked backup data is equal to or less than a predetermined number. Further, at the time of detecting a cyber attack, a state in which the locked latest backup data exists is maintained by extending the lock period. By performing control in this manner, it is possible to secure a state in which normal data exists and to appropriately delete unnecessary data.

In step S506, an access control list for an object storage may be updated instead of extension of a lock period to stop the access. For example, the access to the object storage may be stopped while a cause of the cyber attack is investigated. Both the extension of the lock period for an object and the update of the access control list may be executed.

In response to the object storage attack detection program detecting a cyber attack, the processing in FIG. 5 may be executed to extend the lock of the snapshot in the storage 200.

In the object storage 400, even when lock of an object is set, the update itself may be not prohibited, but versions of the object may be managed and data before the update may be left as an old version. In this case, writing to the object storage 400 does not cause an error, but normal data is left as an old version. In particular, in a case of an object storage having such a specification, the storage amount and the transfer amount are greatly diverged, and a cyber attack is easily detected. The object storage attack detection program may be applied only to the object storage 400 of which the version is managed. When data is compressed and transferred, an already-transferred capacity is calculated in consideration of the transferred compression.

An example of a method of detecting a cyber attack has been described with reference to FIG. 14. A cyber attack can also be detected by another method. The transfer amount used in FIG. 14 may be stored as information in the backup information 1001. The backup information 1001 includes a generation number, a volume number, a storage number, a time, a type, and a transfer amount. The transfer amount is the same as a data size of a backup generation. Therefore, when a backup size is managed, it is unnecessary to additionally manage the transfer amount. In this case, a cyber attack can be detected using a total value of the storage amount of the object storage 400 and the transfer amount of the backup information 1001. A cyber attack can be detected only by acquiring information from the object storage 400 without accessing the storage 200.

In the example of FIG. 14, since the backup data stored in the object storage 400 is considered to be necessary backup data, it is assumed that objects constituting the backup data are locked. On the other hand, it is also conceivable that the backup data which becomes old and of which the lock period elapses is not deleted and remains. Such backup data may receive a cyber attack.

When the backup data of the objects storage 400 is deleted by a cyber attack, the transfer amount and the storage amount are different, and therefore, the cyber attack can be detected. In this case, the storage amount is smaller than the transfer amount, and therefore, it is necessary to determine in step S504 that storage amount≠(transfer amount−reduction amount).

When the backup data is updated, the amount of data generally changes (increases or decreases), and therefore, a cyber attack can be detected by determination of storage amount≠(transfer amount−reduction amount).

When the backup data is updated but the amount of data does not change, a cyber attack cannot be detected by storage amount≠(transfer amount−reduction amount). When it is desired to detect such a cyber attack, the cyber attack may be detected by a detection method such as adding a checksum to the backup data and periodically checking whether the data is changed. The checksum may be assigned in units of objects or in units of backup data. In the periodic check, a predetermined number of checks may be executed by sampling instead of checking all data.

A method of extending a lock period of an object after detecting a cyber attack has been described with reference to FIG. 14. The lock period may be extended in other cases. Data transfer processing in a backup from the storage 200 to the object storage 400 may be delayed. The backup delay may occur when a network failure occurs or a backup data amount is large.

Figure 15:
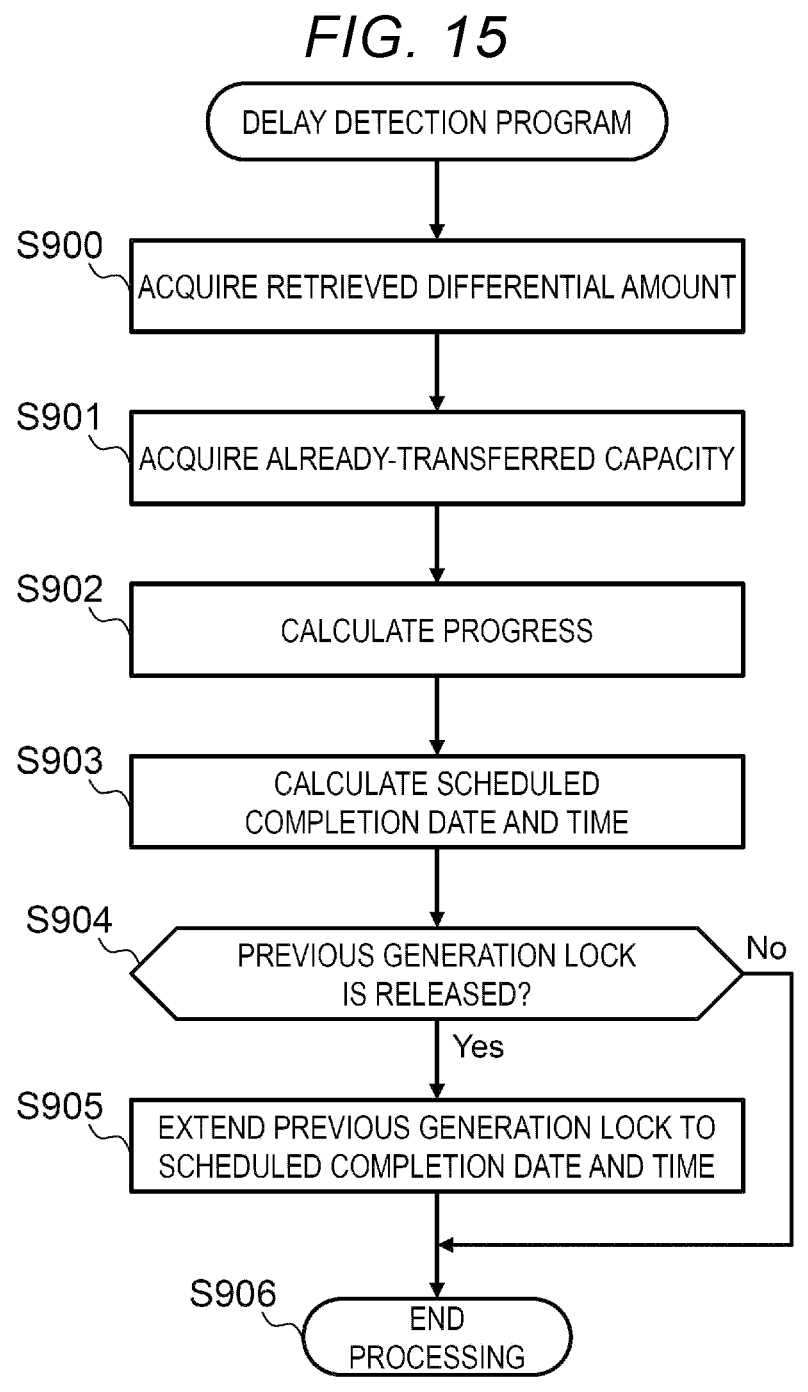

In a case where transfer of backup data is delayed, a lock period of the backup data stored in the object storage 400 (that is, backup data of an old generation) may end, and lock may be released. In a case of a delay due to a network trouble or the like requiring a long period of time for recovery, there is a high possibility that there is no more locked backup data. In order to avoid such a situation, the lock period is extended in a case where a delay detection program illustrated in FIG. 15 as an example detects the delay of the backup data transfer.

The delay detection program is an example of a program for detecting a delay of backup data from the storage 200 to the object storage 400.

The delay detection program may operate on the storage 200, the management terminal 270, or the external management software 410.

The delay detection program acquires the differential amount retrieved by the backup processing in step S303 and the already-transferred capacity from the storage 200 (steps S900 and S901).

Next, the delay detection program calculates a progress of the backup processing and a scheduled completion date and time (steps S902 and S903). The progress can be calculated by already-transferred capacity (acquired in step S901) differential amount (acquired in step S900). When data is compressed and transferred, an already-transferred capacity is calculated in consideration of the transferred compression.

Next, the delay detection program determines whether there is backup data of which lock is released before the date and time calculated in step S903 (step S904). In a case of Yes in step S904, that is, in a case where there is an already-acquired backup of which lock is released before a backup in processing is completed due to the backup delay, lock of an object constituting the backup data is extended to the date and time calculated in step S903 (step S905). In a case of No in step S904, that is, in a case where there is no already-acquired backup of which lock is released before the backup in processing is completed due to the backup delay, the processing ends in step S906.

In step S903, the scheduled completion date and time may be calculated by linear interpolation. The calculation may be performed by other methods.

In step S905, a date and time of the date and time calculated in step S903+α may be set. α is the number of days serving as a buffer when the backup processing is delayed again in the future.

An object of which lock is extended may be limited in consideration of the above-described backup holding number. For example, in a case where five backups are provided and holding of three backups is required, steps S904 and S905 may be executed for three already-acquired backups that are new at the acquisition date and time.

In a case of a network device trouble or a line carrier trouble, a scheduled completion date and time of a backup may not be calculated in step S903. Specifically, the actual result of the transfer amount of the network may be 0 MB/s, and the scheduled completion date and time may become infinite when being calculated. In such a case, the lock is extended for a certain period of time (for example, one week) in step S905. Then, the delay detection program may be executed again when a certain period of time elapses (e.g., after one week). When the lock period to be extended is equal to or longer than a predetermined length (one month or the like), the lock period may be extended by the predetermined length and the delay detection program may be executed again.

FIG. 16 is a diagram illustrating an example of a backup performance table.

In FIG. 16, the backup performance table manages an actual result of transfer performance to an object storage. A date and time at which the backup processing is completed can be calculated using the transfer performance. The backup performance table holds information of a volume number, an object bucket, and transfer performance.

The volume number records a backup target volume number.

The object bucket is information of an object storage that stores backup data.

The transfer performance manages an actual result of performances of the backup processing for a volume identified by the volume number.

An actual transfer data amount may also be managed.

Second Embodiment

In the first embodiment, lock for a snapshot, lock for an object, and a method of extending lock (lock for a snapshot, lock for an object) when a predetermined condition is detected have been described. In a second embodiment, a method of setting a lock period shorter than a lock period to be originally set for the object storage 400 and extending the set lock period as necessary will be described. The lock period to be originally set is, for example, a lock period designated by a user or a lock period stored in a lock period of a backup table. A reason why such a method is effective will be described.

When lock of the object storage 400 is set once, data cannot be deleted while the object storage 400 is locked. On the other hand, in a case of backup data, a specific generation of a backup may become unnecessary and may be desired to be deleted. In addition, the backup data may be desired to be migrated to another more inexpensive storage. When an object is locked, the object cannot be deleted even when a backup of an unnecessary generation is deleted. In addition, when backup data is migrated to another storage, data that becomes unnecessary due to the migration cannot be deleted. In a case of the object storage 400 provided as a storage service such as a public cloud, charging is incurred for unnecessary data that cannot be deleted. In a case of an appliance type object storage, the storage capacity continues to be consumed with unnecessary data.

Processing of migrating backup data to another storage will be described below with reference to FIG. 17. Processing of deleting backup data of a specific generation will be described with reference to FIG. 18. Processing of deleting an object, which becomes unnecessary, will be described with reference to FIG. 19.

Figure 17:
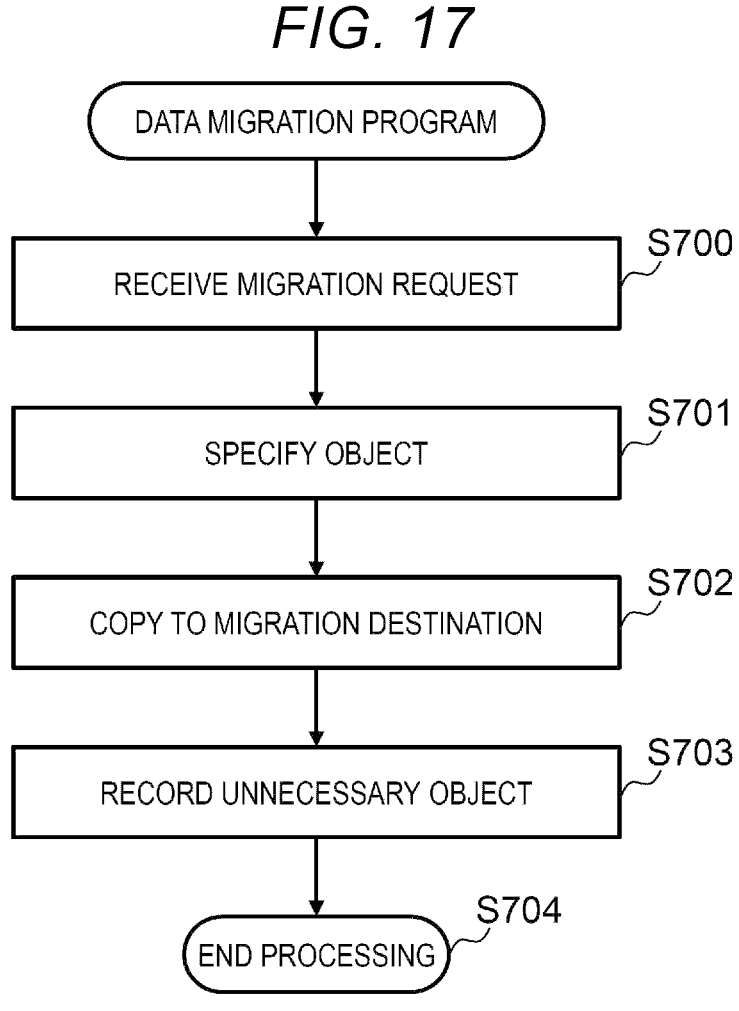
FIG. 17 is a flowchart illustrating an example of data migration processing.

A data migration program illustrated in FIG. 17 is an example of a program for migrating an object stored in the object storage 400 to another storage.

The data migration program receives a backup data migration request (step S700). At this time, a migration target backup information (target volume and/or generation) and migration destination information (in a case of another object storage, object storage information, a storage destination bucket, and the like) are received. When a plurality of backup generations are to be migrated, the subsequent processing may be executed a plurality of times. Next, the data migration program specifies an object, which is a migration target (step S701), and copies the object to a migration destination (step S702).

Finally, the copy source object is recorded as an unnecessary object (step S703), and the processing ends (step S704). In step S703, release of lock may be waited, and the unnecessary object may be deleted.

Step S701 will be described. In step S701, the processing is different depending on the migration target. Examples of the migration target include (a) all backups of all volumes, (b) a backup of a specific generation of a specific volume, and (c) all backups of a specific volume.

A case of (a) will be described. This case is used to change a backup destination. All of the catalog 1000, the backup information 1001, the differential information 1002, and the data 1003 may be copied to a migration destination. When a backup acquired thereafter is also acquired at the migration destination, an object bucket of a backup table of the storage 200 may also update information of a migration destination storage.

A case of (b) will be described. This case is used in, for example, a case where backup data which becomes old for a certain period of time or longer is transferred to a more inexpensive storage.

The data migration program acquires the differential information 1002 using the volume number and the generation of the target backup received in step S700. As described above, an object key of the differential information 1002 is information indicating volume number+generation number+differential information acquisition request, and can be accessed using the information received in step S700.

Subsequently, the data migration program acquires the data 1003 using the volume number and the generation of the target backup received in step S700. As described above, an object key of the data 1003 is information indicating volume number+generation number+data acquisition request, and can be accessed using the information received in step S700.

The data migration program writes the acquired differential information 1002 and data 1003 to the migration destination storage. In order to access the backup of the migrated generation, it is necessary storage information of the migration destination. This can be implemented by storing, in the backup information 1001, storage information which stores the differential information 1002 and the data 1003. The backup information 1001 has fields of generation number, volume number, storage number, time, type, and storage information. A migration destination object storage and bucket information are stored in the storage information.

A case of (c) will be described. Migration of all backups of a specific volume can be implemented by executing the processing illustrated in (b) for each generation of the specific volume.

The data migration program can operate on a virtual computer (VM) of the cloud 2 in addition to external management software and a management terminal. This may be implemented by a service such as serverless provided by the cloud 2. The unnecessary object in step S703 is notified to the external management software and the management terminal, and is managed by the external management software and the management terminal. As described above, when the data migration program waits for lock release and deletes an unnecessary object, it is unnecessary to manage the unnecessary object. When an unnecessary object is managed and deleted in a non-synchronous manner with the data migration program, an object deletion program to be described later deletes the object.

FIG. 18 illustrates an example of processing for merging objects constituting a backup. As a case where merging of objects is required, a backup may be deleted, and the example of FIG. 18 illustrates processing for merging objects when backup deletion is received.

A backup deletion program illustrated in FIG. 18 is a program for deleting a backup, and a differential merge program is a program for merging objects.

The backup deletion program and the differential merge program can operate on the VM of the cloud 2 in addition to the external management software and the management terminal. This may be implemented by a service such as serverless provided by the cloud 2. These two programs may operate on different devices, and for example, the backup deletion program may operate on external management software, and the differential merge program may operate on the service or the VM of the cloud 2.

The merging of objects will be described. A backup method according to the present invention is as described in FIG. 9, and only differential data generated between backups is stored in the object storage 400.

For example, a backup of April 1 has data of addresses 1, 2, and 3. A backup of April 2 has data of addresses 4, 5, and 6. A backup of April 3 has data of addresses 5 and 6. At the time of restoring the data of April 3, the data of April 1 to April 3 are written to a restoration destination volume in order from the oldest. That is, in order to restore the data of April 3, the data of April 1 and April 2 are also required. In a case where all the data of April 2 is deleted in accordance with deletion of the backup of April 2, the backup of April 3 cannot be restored. The data of April 2 required for restoration of April 3 is only the data of an address 4. A reason is that the data of the addresses 1, 2, and 3 are included in the backup of April 1, and the data of the addresses 5 and 6 are also included in the backup of April 3. As described above, the data of the address 4 of April 2 is merged with the backup data of April 3 at the time of deleting the backup of April 2. The merging of objects is referred to as differential merge.

The backup deletion program receives a backup deletion request (step S600). At this time, a volume number and a generation, which are deletion targets, are received. As the generation, a plurality of generations may be designated. The backup deletion program activates the differential merge program, and notifies information of the deletion target generation and information of a generation of which differences are merged. The generation of which differences are merged is a backup of a generation next to a deletion target backup generation. In the example of FIG. 18, the generations 1 to 4 are deleted, and necessary data of the generations 1 to 4 are merged into a generation 5.

The differential merge program acquires the differential information 1002 of each generation (in the example of the drawing, generations 1 to 4 and generation 5) (step S601). Subsequently, the differential merge program specifies data necessary after the merge using the differential information (step S602). In the above example, the data of the address 4 of April 2 is specified.

Next, the differential merge program reads out data of each generation, generates data after merge (step S603), and stores the data after merge (step S604). In the above-described example, data obtained by merging the address 4 of April 2 and the addresses 5 and 6 of April 3 is generated and stored. The object to be stored may be stored as an object key of the generation 5. That is, the generation 5 may be overwritten. The object may be saved as another object key.

The differential merge program notifies the backup deletion program of an increase in a capacity of the generation 5 associated with the differential merge (step S605).

The backup deletion program records an object that becomes unnecessary due to backup deletion (step S606). The processing is the same as step S703. Subsequently, the backup deletion program records the increased capacity (step S607).

At the time of merging objects, the increased capacity recorded in step S607 is added to the storage capacity in the determination of step S504. Therefore, recording is performed in step S607.

Finally, the backup deletion program deletes the backup information 1001, which is a backup target, updates the generation information of the catalog 1000 (step S608), and ends the processing (step S609).

Figure 19:
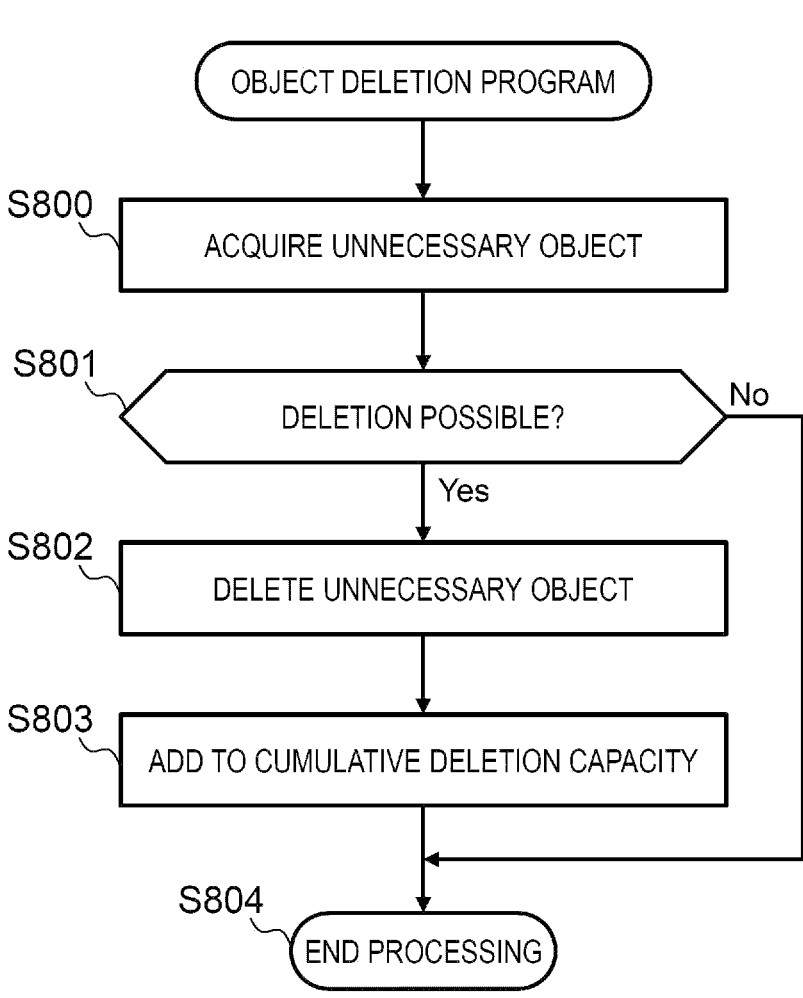
FIG. 19 is a flowchart illustrating an example of object deletion processing.

FIG. 19 illustrates an example of processing for deleting an object that becomes unnecessary. The object that becomes unnecessary means the object recorded as unnecessary in step S606 or step S703 described above. The object deletion program deletes the object that becomes unnecessary by instructing the object storage 400 or the like to delete the object.

The object deletion program can operate on the VM of the cloud 2 in addition to the external management software and the management terminal. This may be implemented by a service such as serverless provided by the cloud 2.

The object deletion program acquires an unnecessary object list (step S800). This is implemented by acquiring the information recorded in steps S606 and S703.

Next, the object deletion program executes steps S801 to S804 for each acquired object. In step S801, the object deletion program determines whether the object can be deleted. Specifically, when a lock period of the object is ended, it is determined that the object can be deleted. On the other hand, when the lock period of the object is not ended, the object cannot be deleted.

When the result of step S801 is deletion disabled, the object deletion program skips steps S802 and S803 and ends the processing (step S804).

On the other hand, when the result of step S801 is deletion enabled, the object deletion program deletes the unnecessary object (step S802), adds a size of the deleted object to a cumulative deletion capacity (step S803), and ends the processing (step S804).

Management of an unnecessary object can be implemented by adding unnecessary generation information to the catalog 1000, for example. In this case, the catalog 1000 includes a volume number, a storage number, acquired generation information, and unnecessary generation information. The object deletion program can periodically access the catalog 1000 and specify an unnecessary generation. In a case where the unnecessary generation is specified, unnecessary object can be deleted by deleting the backup information 1001, the differential information 1002, and the data 1003 of the unnecessary generation.

In steps S606 and S703, information of an unnecessary generation or information of an unnecessary object may be recorded in the management terminal, the external management software, or another database.

When long-period lock is set for the object storage 400, it requires a long period of time until an object that becomes unnecessary in FIGS. 17 and 18 is deleted by the object deletion program in FIG. 19.

Therefore, a method of setting a lock period shorter than a lock period to be originally set for the object storage 400 and extending the set lock period as necessary will be described.

FIG. 20 is an example of a lock management table for managing the lock period to be originally set and a lock period actually already set in the object storage 400.

The lock management table manages a volume number, a backup generation, a requested lock period, an already-set lock period, and necessity.

The volume number records a backup target volume number.

The backup generation is generation information of a backup for the volume identified by the volume number.

The requested lock period is information indicating a period during which it is necessary to lock the backup. Specifically, date information at which lock may be released is managed. The requested lock period may store a value input by the management software from the user or may be determined by the management software or the like.

The already-set lock period manages a lock period actually set for the object storage 400.

In the example of FIG. 20, lock is necessary up to 15:00 on September 30. On the other hand, lock up to 15:00 on April 25 is already set for the object storage 400. Further, when 15:00 on April 25 approaches, the lock period is extended as necessary. Processing of extending the lock period will be described with reference to FIG. 21.

The necessity is an example of the information for managing an unnecessary generation described with reference to FIG. 19. The necessity indicates whether the backup specified by the volume number and the backup generation is necessary. In step S703 of FIG. 17 or step S606 of FIG. 18, a value of "necessity" is set to be unnecessary. Although unnecessary objects are recorded in FIGS. 17 and 18, since all objects constituting backup data of a specific generation are unnecessary in the examples of FIGS. 17 and 18, it is possible to manage the necessity of the objects for each backup generation. It is possible to manage the necessity of the object for each backup generation based on the "necessity" of the lock management table. In addition, the necessity may be managed for each object. For example, it can be implemented by managing a list of object keys of unnecessary objects.

The lock management table is stored in external management software, a management terminal, or a database service provided by the cloud 2. Since the above-described object deletion program is referred to, in a case where the lock management table is stored in the same device as the device on which the object deletion program operates, communication between the devices is minimized, and thus the efficiency is favorable.

Figure 21:
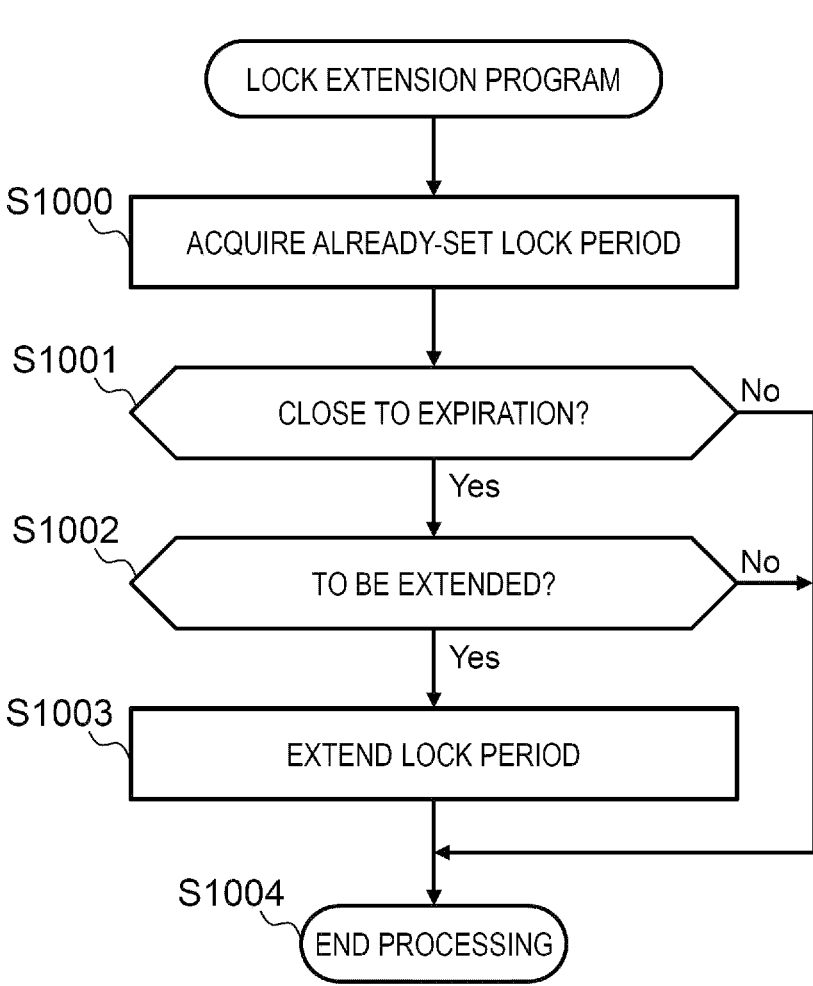
FIG. 21 is a flowchart illustrating an example of lock extension processing.

FIG. 21 is an example of a program for extending the lock period set for the object storage 400.

A lock extension program can operate not only on the external management software and the management terminal but also on the VM of the cloud 2. This may be implemented by a service such as serverless provided by the cloud 2. Since a lock period extension program may receive a cyber attack, the lock period extension program may be executed in a data center other than the data center 1 and the cloud 2. The lock extension program may be operated in a logically isolated environment in the cloud 2.

The lock extension program acquires a lock period actually set for the object storage 400 (step S1000). The processing is implemented by acquiring the already-set lock period of the lock management table.

Next, the lock extension program determines whether an end date and time of the lock acquired in step S1000 is equal to or less than a certain number of days (step S1001). For example, it is whether to be within 5 days. In other words, the lock extension program determines whether the already-set lock period is within a predetermined range before expiration. The processing is implemented by comparing a date and time when the lock is released with a current date and time.

When a result of step S1001 is "No", that is, when there is a certain number of days or more until the lock is released, the lock extension program ends the processing (step S1004).

On the other hand, when the result of step S1001 is "Yes", that is, when there is a certain number of days or less until the lock is released, the lock extension program determines whether to extend the lock (step S1002). The requested lock period and the already-set lock period are compared, and when the requested lock period is a future date and time, the lock may be extended. In other words, when expiration of the already-set lock period is earlier than expiration of the requested lock period, the lock extension program may extend the set lock period. In addition to this condition, when the target object is necessary for backup, it is determined to extend the lock period. Since unnecessary objects are recorded in steps S703, S606, and S802, when an object is not recorded in these steps, the lock period is extended.

When a result of step S1002 is "No", that is, when extension of the lock period is unnecessary, the lock extension program ends the processing (step S1003).

On the other hand, when the result of step S1002 is "Yes", that is, when extension of the lock period is necessary, the lock extension program extends the lock period (step S1003) and ends the processing (step S1004).

The period extended in step S1003 may be any period. For example, the period is one week. The period may be determined by a cycle of executing the lock extension program. The period may be determined from the requested lock period and the number of times of extension. For example, when the requested lock period is ten months and the number of times of extension is ten, the update may be performed in units of one month. There may be an upper limit of the number of times of extension depending on the object storage 400. In this case, a determination method based on the requested lock period and the number of times of extension as described above is preferable.

At the time of determining the period to be extended, control is performed so that the date and time is not earlier than the requested lock period. For example, in a case of extending one week, when the date and time is later than the requested lock period, the requested lock period is set to the date and time after the extension.

Extension of lock is executed for each of objects constituting backup data. In a case where backup data including a plurality of objects, an instruction to sequentially extend lock for each of the objects is given.

Third Embodiment

In the first and second embodiments, a configuration of only the data center 1 or a configuration in which the data center 1 and the cloud 2 cooperate with each other has been described as an example. In a third embodiment, a configuration of only the cloud 2 will be described. In the cloud 2 such as a public cloud, the object storage 400 is utilized. For example, data of a software defined storage (SDS) operating on the cloud 2 is backed up to the object storage 400. In addition, low-frequency access data of SDS may be moved to the object storage 400. Even when the security of the SDS itself is strong, the data arranged in the object storage 400 may be accessed using an access method of the object storage 400 instead of the SDS. Therefore, lock of the data stored in the object storage 400 is necessary.

FIG. 22 is a diagram illustrating a configuration example of a storage 500. The storage 500 illustrated in FIG. 22 is constructed by SDS operating on a public cloud. However, the storage 500 may include hardware that performs specific processing or the like. Examples of this type of hardware include hardware for compressing data and hardware for encrypting data. The storage 500 may be a storage provided as a service.

As illustrated in FIG. 22, the storage 500 is communicably connected to a management server 501 via a network 502. The storage 500 includes a plurality of storage servers 503 and a plurality of cloud storages 507 constituting a volume 509.

Each of the storage servers 503 includes a physical server, a virtual machine, a container, or the like. In addition, the storage server 503 includes a communication port 504, a memory 505, and a CPU 506. The communication port 504 is communicably connected to the management server 501 via the network 502. In addition, the communication port 504 is connected to the object storage 400. The communication port 504 may also be connected to a server that executes an application. The server also includes a physical server, a virtual machine, a container, or the like. Data used in services such as a database and computing provided by the public cloud may be stored.

The memory 505 records a program that defines an operation of the CPU 506, control information used in the program, and the like. The CPU 506 is a processor that reads the program recorded in the memory 505, executes the read program, and executes various processing. In the present embodiment, the CPU 506 of each storage executes the program to implement a function of a storage. The CPU 506 receives an I/O request from a server or the like that executes the above-described application, and writes and reads data to and from the cloud storage 507 in accordance with the I/O request.

The cloud storage 507 is a storage area of the storage server 503. A storage area may be created using a storage service of a public cloud and installed as the cloud storage 507 in the storage server 503. The volume 509 may be configured over the plurality of cloud storages 507 and provided to the server. The data written to the volume may be made redundant among the plurality of cloud storages 507. A redundancy method is not particularly limited, and examples thereof include a method using data duplication and a method using erasure coding.

A configuration of the storage 500 illustrated in FIG. 22 is merely an example, and is not limited thereto. For example, the storage 500 may have the same configuration as the storage 200. In addition, each storage server 503 may be installed across a plurality of areas that may be independently operated (data center, partition that secures availability, and partition (tenant or the like) that is logically divided for each application or user). In addition, the storage 500 and the server may be installed across a plurality of areas (data center, partition that ensures availability, partition (tenant or the like) that is logically divided for each application or user). In addition, the storage 500 and the server may be installed on different clouds or may be installed on a cloud service provided by another vendor on a public cloud vendor.

The management server 501 is a management device for managing and maintaining a sub storage 500. The management server 501 includes a memory 501a and a CPU 501b. The memory 501a records a program that defines an operation of the CPU 501b, various information used in the program, and the like. The CPU 501b is a processor that reads the program recorded in the memory 501a, executes the read program, and executes various processing. A function of the management server 501 may be implemented by any of the storage servers 503.

A method of locking an object of the object storage 400 when the storage 500 operating on the cloud 2 backs up data stored by the storage 500 in the object storage 400 is the same as the method described in the first and second embodiments. The storage 200 may be the storage 500 and the data center 1 may be the cloud 2. The storage 500 includes programs and tables included in the storage 200 among a backup program, a data transfer program, and other necessary tables.

A method of locking an object of the object storage 400 at the time of storing, in the object storage 400, a part of data stored in the storage 500 operating on the cloud 2 will be described. This example is also applicable to a case where a part of data stored in the storage 200 is stored in the object storage 400. However, in consideration of facts that a distance between the data center 1 and the cloud 2 is long and an access time is long, a configuration in which a part of data stored in the storage 500 is stored in the object storage 400 is considered to be more general.

A hierarchical control function of moving low-frequency access data of SDS to the object storage 400 will be described below with reference to FIGS. 23 to 28.

Figure 23:
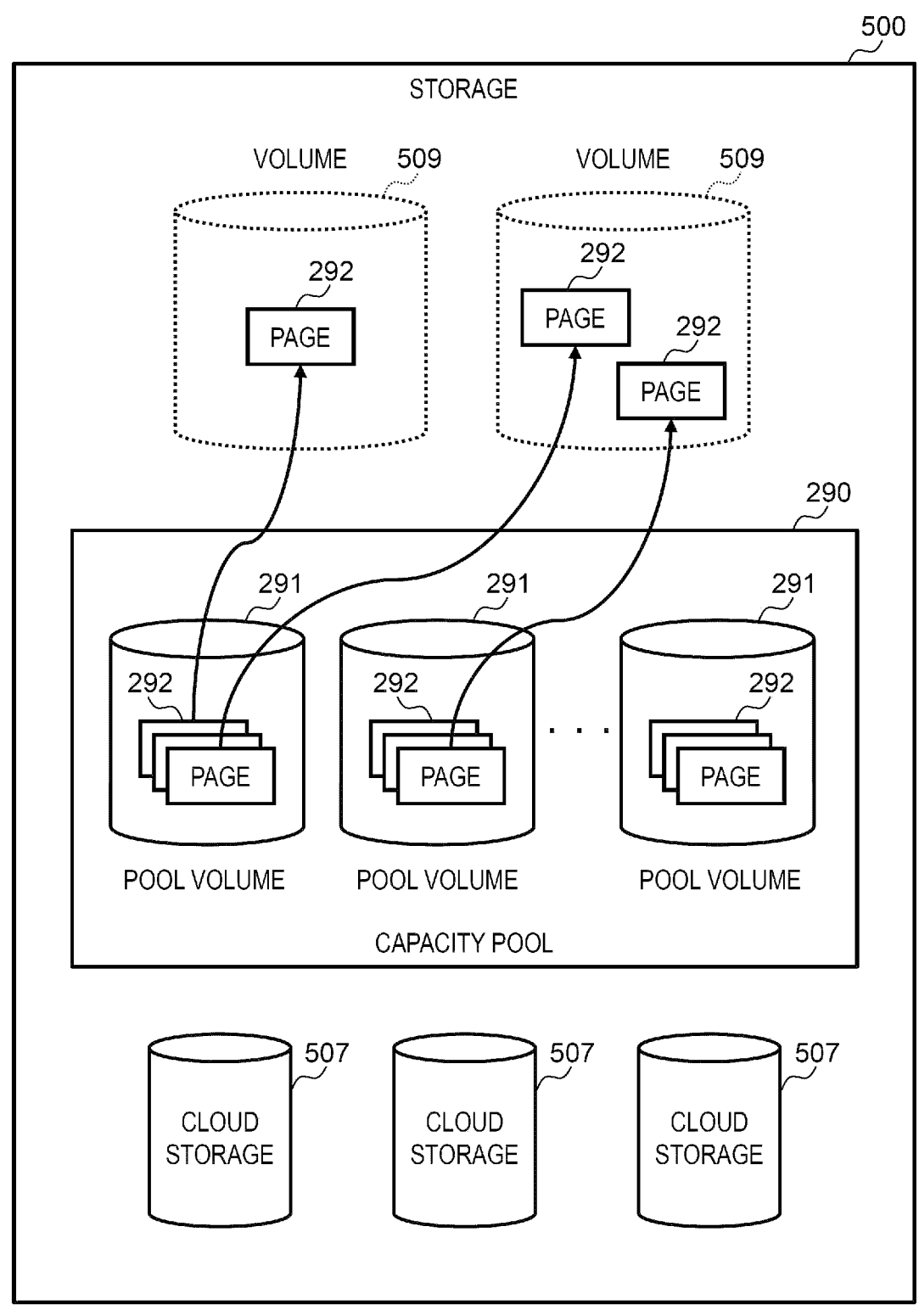
FIG. 23 is a diagram illustrating a relation among volumes, a capacity pool, and pool volumes 291.

The hierarchical control function determines and changes a storage destination of data using data access frequency information. It is general to move data not in units of volumes but in units of finer grain. A basic structure such as a data transfer unit will be described with reference to FIG. 23. In FIG. 23, movement in a unit smaller than a volume called a page is described, but the present invention can also be applied to a case of movement in units of volumes.

FIG. 23 is a diagram illustrating a relation among a plurality of the volumes 509, a capacity pool 290, pool volumes 291, and the cloud storages 507.

The storage 500 creates the pool volumes 291 from storage areas of the plurality of cloud storages 507. The capacity pool 290 includes one or more pool volumes 291. Each of the pool volumes 291 includes pages 292 which are physical storage areas to be an allocation unit to the volume 509. A capacity of each of the pages 292 is, for example, several KB to several tens of MB.

In a case where data is written to the storage area in the volume 509, the storage 500 allocates the page 292 in the pool volume 291 to the area. That is, since the page 292 is not allocated to an unused area of the volume 509, the storage area of the cloud storage 507 is not consumed. A page that is a physical storage area may be created for the cloud storage 507. In this case, the pool volume 291 becomes unnecessary. In this case, a pool table to be described later manages addresses of the cloud storage 507 as a start address and an end address.

FIG. 24 illustrates an example of the pool table.

The pool table is a table that manages the pages 292 in the capacity pool 290, and is stored in, for example, a control information unit of a memory of the storage 500.

The pool table manages a record (entry) in which fields of a page number, the start address, the end address, a state, and an allocation destination are associated. The page number stores a page number for identifying the page 292 stored in the capacity pool 290. In order to identify the area of the page 292, the start address and the end address are used. The addresses are addresses for managing the entire capacity pool 290. Of course, the area of the page 292 may be managed by a pool volume number and an in-pool-volume address. When a page size is a fixed length, the end address becomes unnecessary.

The start address stores a start address of the corresponding page 292. The end address stores an end address of the corresponding page 292. The state stores information indicating whether the corresponding page 292 is already allocated to the volume 509 or is not allocated to the volume 509. The allocation destination stores a volume number to which the corresponding page 292 is allocated. According to a top record of the pool table, it can be seen that a page with a page number "1" has a start address of "0" and an end address of "99", and is already allocated to the volume 509 with a volume number "1". A table for managing unallocated page numbers may be provided. In this case, it is possible to search for unallocated pages at a high speed.

FIG. 25 illustrates an example of a volume table.

The volume table is a table for managing allocation of the page 292 to the volume 509, and is stored in, for example, the control information unit of the memory of the storage 500.

The volume table 225 manages a record including fields of a volume number, an address, a page allocation state, a page number, a read frequency (times/hr), and a write frequency (times/hr). An address range in the volume 509 is divided into areas having the same size as the page 292. One record indicates one area. This area may also be called a virtual page.

The volume number stores a volume number for identifying the volume 509. The address stores a range of addresses in the corresponding volume 509. The page allocation state stores information indicating whether a page is already allocated to an area indicated by the range of the corresponding address. Here, a page to be allocated to an area may correspond to the page 292 in the capacity pool 290 or may not correspond to the page 292 in the capacity pool 290. The page number stores a page number of the page allocated to the area, or an identifier indicating that the page allocated to the area does not correspond to the page 292 in the capacity pool 290. When the data stored in the area is physically stored in the capacity pool 290, the page number stores the number of the page 292 in the capacity pool 290. When the data stored in the area is not physically stored in the capacity pool 290 but is stored in the object storage 400, the page number stores information indicating the object storage 400, for example, object storage information and bucket information, instead of the page 292 in the capacity pool 290.

The read frequency (times/hr) stores the number of times of reading issued per unit time for the corresponding area. The write frequency (times/hr) stores the number of times of writing issued per unit time for the corresponding area. In the present embodiment, the unit time is one hour, but may be one day, one minute, or one second. The storage 500 measures an access frequency (read frequency and write frequency) of each area and updates the volume table.

According to a top record of the volume table, the page 292 with a page number "2" is allocated to an area of addresses 0 to 99 of the volume 509 with the volume number "1", and it can be seen that the read frequency and the write frequency are higher than those of the other addresses.

FIG. 26 is an example of a flowchart of a tiering program for storing, in the object storage 400, low-frequency access data (cold data) stored in the storage 500 and storing high-frequency access data (hot data) in the storage 500.

The tiering program calculates an optimum data storage layout based on a change in IO frequency information, and activates a demotion program and a promotion program for actually changing data arrangement. A change in data storage location in accordance with a change from hot data to cold data is referred to as demotion. Further, a change in data storage location in accordance with a change from cold data to hot data is referred to as promotion. The tiering program is periodically executed in the storage 500. For example, when a review frequency of the data arrangement is once per hour, the tiering program is activated once per hour. The review frequency of the data arrangement may be set by a user or a storage administrator via a management server or the like.

First, the tiering program acquires the IO frequency information of each area of the volume 509 from the volume table (step S3000), and calculates an optimum data arrangement using the IO frequency information (step S3001). Next, the tiering program compares the optimum arrangement with a current arrangement, and determines data to be promoted and data to be demoted (steps S3002 and S3003).

As an example of arrangement determination, the tiering program arranges the areas of each of the volume 509 in descending order of IO frequency. Next, the tiering program derives an IO frequency threshold for determining hot data and cold data from a capacity of the capacity pool 290 of the storage 500, and determines data of which area is to be stored in the capacity pool of the storage 500 as hot data.

Then, the tiering program specifies data, which is a promotion target, except for data already stored in the capacity pool 290. Similarly, the tiering program specifies, as a demotion target, data that cannot enter the capacity pool 290 among the data already stored in the capacity pool 290.

Hereinafter, step S3004 and subsequent steps of the tiering program will be described. The tiering program designates a demotion target and calls the demotion program (step S3004). Finally, the tiering program 511 designates a promotion target, calls a promotion program, and ends the processing (step S3005). A capacity of the storage 500 is often smaller than a capacity of the object storage 400. In order to create a free page in the capacity pool 290, the tiering program basically executes the demotion program first. In a case where a plurality of pieces of data are to be promoted and decelerated, an area for hot data storage can be effectively used by alternately executing the demotion and the promotion.

According to the tiering program, the storage 500 classifies the areas into a first group or a second group based on the access frequency of each area, allocates pages associated with the capacity pool 290 to the areas classified into the first group, and allocates pages not associated with the capacity pool 290 to the areas classified into the second group. The first group is, for example, an area corresponding to hot data. The second group is, for example, an area corresponding to cold data. Accordingly, it is possible to prevent a decrease in access performance to data stored in the storage 500 and to save the capacity of the storage 500.

Figure 27:
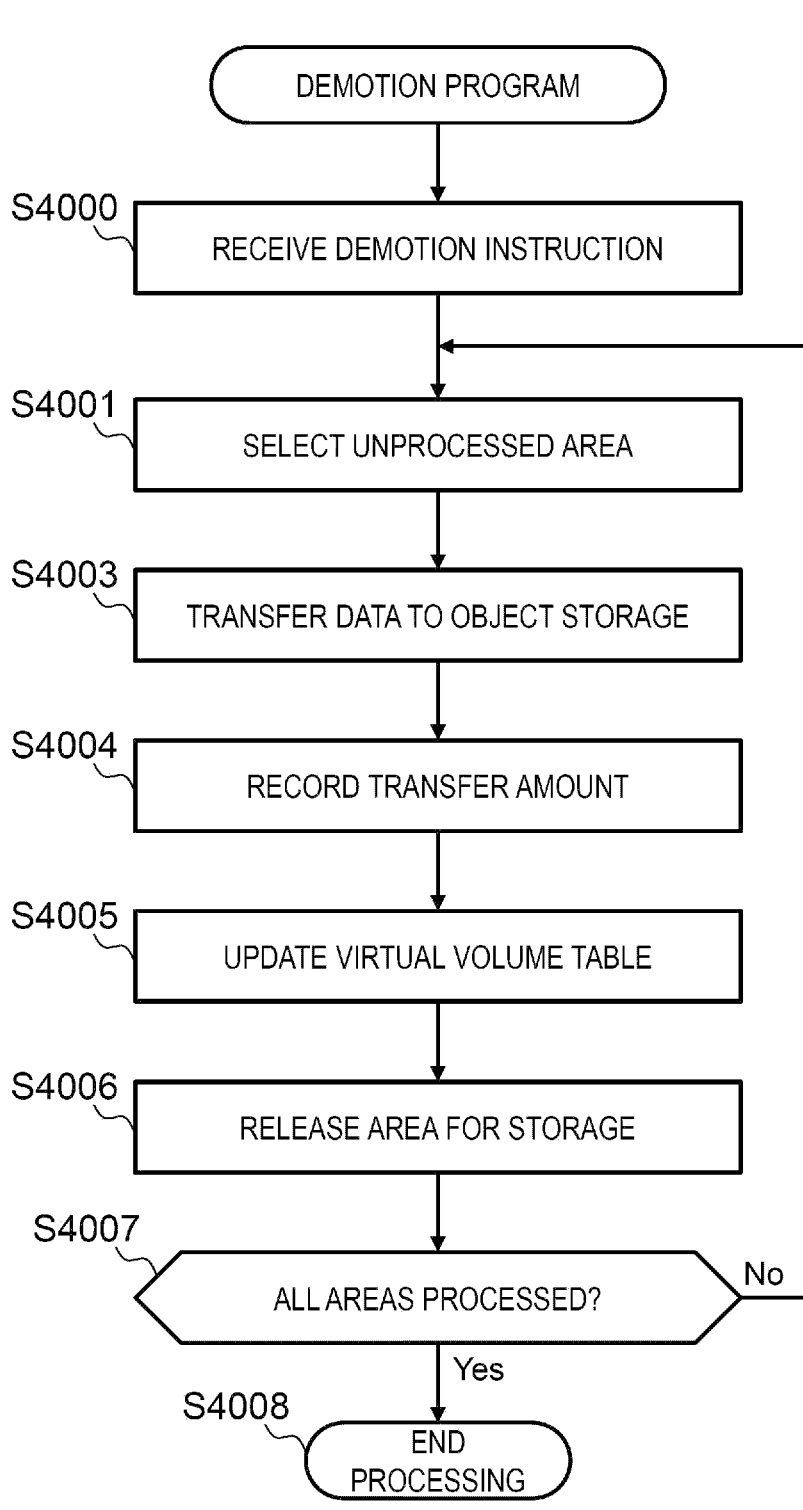
FIG. 27 is a flowchart illustrating an example of demotion processing.

FIG. 27 is an example of a flowchart of the demotion program.

The demotion program is called by the tiering program and executed in the storage 500.

First, the demotion program receives a demotion instruction (step S4000). At this time, the demotion program receives, as a parameter, an area (area specified by volume number and address in volume) in one or more volumes 509, which are demotion targets.

In the present embodiment, the demotion program receives a plurality of pieces of area information and performs processing on a plurality of areas. However, the demotion program may have a function of performing demotion of one area, and the tiering program may call the demotion program for a plurality of times.

Next, the demotion program selects one unprocessed area from the demotion targets (step S4001), and transfers data stored in the area to the object storage 400 (step S4003). At this time, the data transfer program designates lock of the object to be transferred. Next, the demotion program records a transfer amount table transferred to the object storage (step S4004). The processing is the same as steps S307 and S308 described using the data transfer program.

Next, the demotion program updates the volume table of the volume 509 using the area (step S4005). Specifically, the demotion program stores object storage information and bucket information in the page number. After the change, the demotion program releases the area of the capacity pool 290 storing the hot data (step S4006).

Next, the demotion program checks whether all instructed areas are processed (step S4007). When all the instructed areas are processed, the demotion program ends the processing (step S4008). On the other hand, when an unprocessed area remains, the demotion program returns to S4001 and executes S4001 to S4006 for the next unprocessed area.

FIG. 28 is an example of a flowchart of the promotion program.

The promotion program is called by the tiering program 511 and executed in the storage 200.

First, the promotion program receives a promotion instruction (step S5000). At this time, the promotion program receives, as a parameter, an area (area specified by volume number and address in volume) in one or more volumes, which are promotion targets.

Next, the promotion program selects one unprocessed area from the promotion targets (step S5001), and secures an area of the capacity pool 290 for storing the area (step S5002). Specifically, the promotion program updates a state 224d and an allocation destination of a pool table 224. In addition, the promotion program updates a page number 225d of the volume table 225.

Subsequently, the promotion program issues a read request to the object storage 400, reads the target data, and stores the target data in the area secured in step S5002 (step S5003).

Then, the promotion program records a copy source object as an unnecessary object (step S5004). In step S5004, release of lock may be waited, and the unnecessary object may be deleted. Recording of an unnecessary object is implemented by changing the value of "necessity" in the lock management table to unnecessary in the examples of FIGS. 17, 18, and 20. In a case of hierarchical control, the entire backup data is not unnecessary as in FIGS. 17, 18, and 20. Therefore, the necessity is managed for each unnecessary object. For example, it can be implemented by managing a list of object keys of unnecessary objects.

The page number 225d of the volume table 225 stores a page number of the pool volume 291. The data is stored, by the storage 500, in the cloud storage 507 installed in the storage 500.

Next, the promotion program checks whether all instructed areas are processed (step S5005). When all the instructed areas are processed, the promotion program ends the processing (step S5006).

On the other hand, when an unprocessed area remains, the promotion program returns to step S5001 and executes steps S5001 to S5005 for the next unprocessed area.

Since the access frequency of data changes in the hierarchical control, it is difficult to determine the lock period. Although long-period lock is set, when the access frequency is increased and the data is promoted to the storage 500, the object remains in the object storage 400 for a long period of time without being deleted. Therefore, it is desirable to set a short lock period as illustrated in FIGS. 20 and 21 and to periodically extend lock. A difference from FIGS. 20 and 21 is that the requested lock period is not present. It is considered that the data stored in the object storage 400 is to be locked until the volume is deleted and the data itself becomes unnecessary. That is, the requested lock period is until the data becomes unnecessary. Accordingly, it is possible to periodically extend the lock period with reference to only the already-set lock period.

In the above description, lock in a case of moving low-frequency data to the object storage 400 has been described by taking the hierarchical control as an example. However, the present invention can also be applied to a case where data to be referred to only from a snapshot is stored in the object storage 400 in a snapshot function described with reference to the storage 200. That is, data referred to only from a snapshot may be moved to the object storage 400 instead of specifying low-frequency access data and moving the low-frequency access data to the object storage 400.

In addition, the present invention can also be applied to a case where basically all data is stored in the object storage 400 and a part of the data is stored in a cache or the cloud storage 507 of the storage 500. In addition to the cache and the cloud storage 507, the data may be stored in an instance store included in the storage server 503 in a case of a public cloud.

Most of the data stored in the object storage 400 is locked, and the lock period is periodically extended. The lock period is periodically extended until an object becomes unnecessary due to volume deletion or data update. When the storage 500 stores data in a log structure, data that is not referred to from any volume is generated due to data update. In such a case, the data becomes unnecessary even when the volume is not deleted, and therefore, it is unnecessary to extend the lock.

Figure 29:
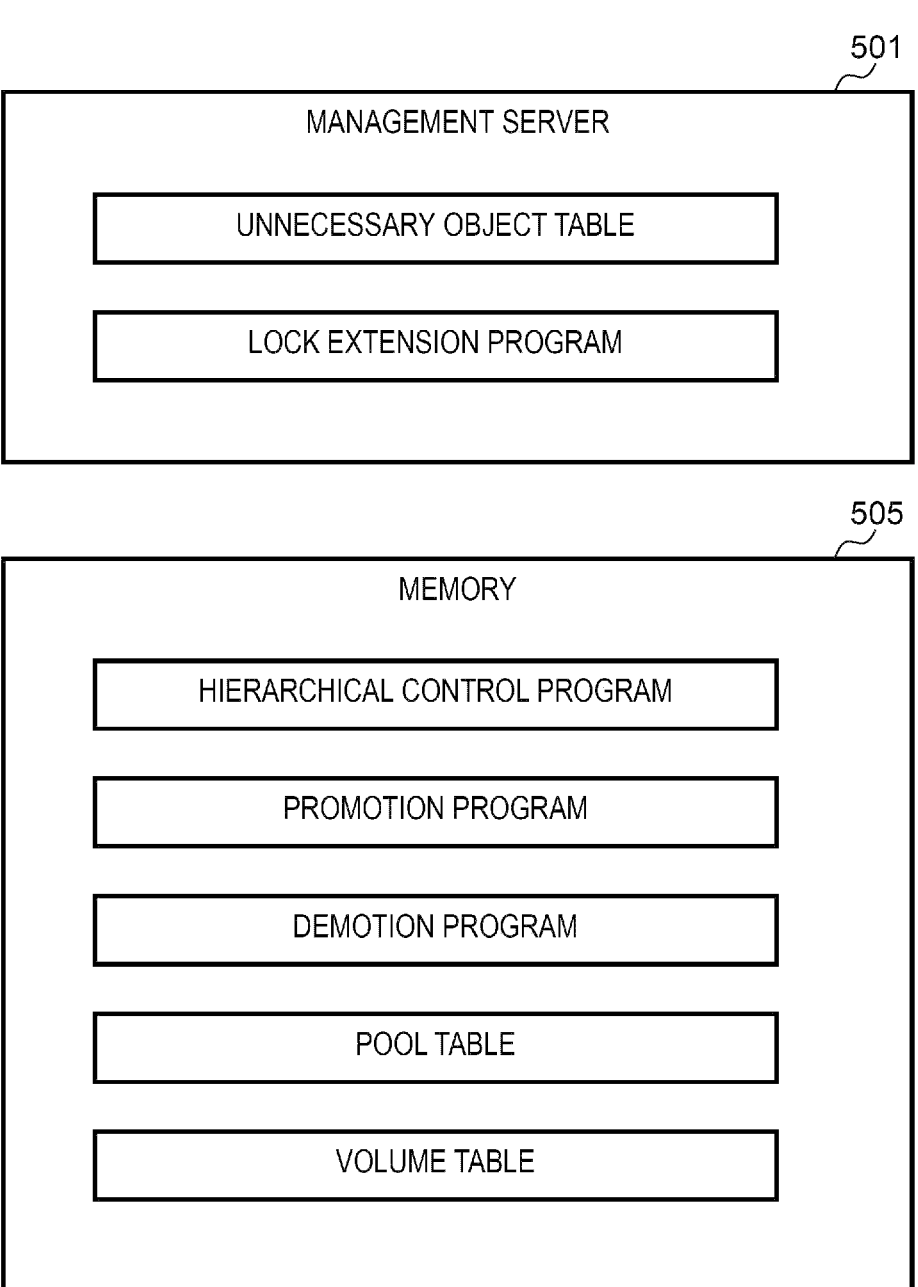
FIG. 29 is a diagram illustrating an example of information recorded in a memory and a management server.

FIG. 29 illustrates programs and control tables stored in the memory 505 of the storage 500, and programs and control tables stored in the management server 501.

The memory 505 stores a hierarchical control program, a promotion program, a demotion program, a pool table, and a volume table. These programs and tables have already been described with reference to the above drawings.

The management server 501 stores a lock extension program and an unnecessary object table. These programs and tables have already been described with reference to the above drawings.

In the above manner, the data stored in the object storage 400 can be safely stored by being locked.

As described above, a storage disclosed is a storage 200 connected to another storage (400) via a network, the storage 200 including: a processor 216 configured to process data to be stored in a storage device (220), in which the processor 216 acquires a first snapshot for a volume generated using a storage area of the storage device, compares a second snapshot, which is a previously acquired snapshot, with the first snapshot to retrieve incremental data, transfers the incremental data to the other storage and stores the incremental data as backup data, and sets lock of the backup data stored in the other storage.

Therefore, data may be stored more safely.

In addition, the processor 216 sets lock for the first snapshot and the second snapshot at the time of acquiring the first snapshot and the second snapshot.

Therefore, both in a case where a snapshot before transfer receives a cyber attack and in a case where an object storage receives a cyber attack, data can be restored to normal data.

In addition, the processor 216 extends a lock period of the backup data transferred to the other storage when the cyber attack is detected.

In addition, the lock prohibits deletion and overwriting of data to be locked.

Therefore, it is possible to avoid a situation of becoming a new attack target caused by release of lock of the backup data, and to secure normal data.

As an example, the processor 216 calculates, based on schedule information of a backup set by a user in advance, a period of the lock set for the first snapshot at the time of acquiring the first snapshot.

As an example, the processor 216 calculates and determines a period of the lock set for the backup data, based on a lock period designated by a user in advance or a holding number of backups and a backup frequency set by the user.

As an example, the processor 216 issues an alert when the first snapshot and the second snapshot are not locked.

As an example, the processor 216 determines, based on a lock target designated by a user regarding lock for the snapshot and lock for the backup data, necessity of setting of the lock.

Therefore, it is possible to avoid a situation of becoming an attack target caused by release of the lock due to a transfer delay or the like, and to secure normal data.

In addition, the processor 216 calculates a total transfer amount of data transferred to the other storage, acquires a storage amount of the transferred data in the other storage, and detects that there is a cyber attack when the total transfer amount and the storage amount are inconsistent.

In addition, the processor 216 extends a lock period of the backup data transferred to the other storage when the cyber attack is detected.

Therefore, a cyber attack can be accurately detected and the backup data can be protected.

In addition, the processor 216 sets, for the backup data, a lock period shorter than a requested lock period, which is a lock period designated by a user, and in a case where the already-set lock period is within a predetermined range before expiration and the target backup data becomes unnecessary, to extend the lock period when the expiration of the lock period is earlier than expiration of the requested lock period.

In addition, after completing transfer of the backup data to the other storage, the processor 216 deletes the data after waiting for lock release of backup data older than the transferred backup data.

As an example, upon receiving a deletion instruction of the backup data, the other storage identifies and records an object that becomes unnecessary due to deletion of the backup data, monitors release of lock of the identified object, and deletes the object when the lock of the identified object is released.

Therefore, it is possible to avoid a situation in which unnecessary backup data remains.

In addition, the other storage is a storage disposed in a cloud, and the storage connected to the other storage is a storage disposed in an on-premises. Therefore, it is possible to protect data when data of an on-premises is stored in a cloud.

Each embodiment of the present disclosure described above is an example for describing the present disclosure, and is not intended to limit the scope of the present disclosure only to the embodiments. Those skilled in the art can execute the present disclosure in various other aspects without departing from the scope of the present disclosure.

What is claimed is:

1. A storage connected to another storage via a network, the storage comprising:
a processor configured to process data to be stored in a storage device, wherein
the processor is configured to:

acquire a first snapshot for a volume generated using a storage area of the storage device, compare a second snapshot, which is a previously acquired snapshot, with the first snapshot to retrieve incremental data, transfer the incremental data to the other storage and store the incremental data as backup data, set a lock of the backup data stored in the other storage, set a lock for the first snapshot and the second snapshot at the time of acquiring the first snapshot and the second snapshot, and calculate, based on schedule information of a backup set by a user, a period of a lock set for the first snapshot at the time of acquiring the first snapshot, and wherein the lock of the first snapshot prohibits deletion and overwriting of data to be locked.

2. The storage according to claim 1, wherein the processor is configured to calculate and determine a period of the lock set for the backup data, based on a lock period designated by a user or a holding number of backups and a backup frequency set by the user.

3. The storage according to claim 1, wherein the processor is configured to determine, based on a lock target designated by a user regarding the lock for the first snapshot and the lock for the backup data, whether to set the lock.

4. The storage according to claim 1, wherein the processor is configured to:

calculate a total transfer amount of the data transferred to the other storage, acquire a storage amount of the transferred data in the other storage, and detect that there is a cyber attack when the total transfer amount and the storage amount are inconsistent.

5. The storage according to claim 4, wherein the processor is configured to extend a lock period of the backup data transferred to the other storage when the cyber attack is detected.

6. The storage according to claim 1, wherein the other storage is a storage disposed in a cloud, and the storage connected to the other storage is a storage disposed in an on-premises.

7. A storage connected to another storage via a network, the storage comprising:

a processor configured to process data to be stored in a storage device, wherein the processor is configured to:

acquire a first snapshot for a volume generated using a storage area of the storage device, compare a second snapshot, which is a previously acquired snapshot, with the first snapshot to retrieve incremental data, transfer the incremental data to the other storage and store the incremental data as backup data, set a lock of the backup data stored in the other storage, set a lock for the first snapshot and the second snapshot at the time of acquiring the first snapshot and the second snapshot, and issue an alert when the first snapshot and the second snapshot are not locked, wherein the lock of the first snapshot and the second snapshot prohibits deletion and overwriting of data to be locked.

8. A storage connected to another storage via a network, the storage comprising:

a processor configured to process data to be stored in a storage device, wherein the processor is configured to:

acquire a first snapshot for a volume generated using a storage area of the storage device, compare a second snapshot, which is a previously acquired snapshot, with the first snapshot to retrieve incremental data, transfer the incremental data to the other storage and store the incremental data as backup data, set a lock of the backup data stored in the other storage, and set, for the backup data, a lock period shorter than a requested lock period, which is a lock period designated by a user, and in a case where the already-set lock period is within a predetermined range before expiration and determining, based on predetermined criteria, to extend the lock period when the expiration of the lock period is earlier than expiration of the requested lock period.

9. A storage connected to another storage via a network, the storage comprising:

a processor configured to process data to be stored in a storage device, wherein the processor is configured to:

acquire a first snapshot for a volume generated using a storage area of the storage device, compare a second snapshot, which is a previously acquired snapshot, with the first snapshot to retrieve incremental data, transfer the incremental data to the other storage and store the incremental data as backup data, set a lock of the backup data stored in the other storage, and after completing transfer of the backup data to the other storage, delete the data after waiting for a lock release of backup data older than transferred backup data.

10. The storage according to claim 9, wherein upon receiving a deletion instruction of the backup data, the other storage is configured to identify and record an object, monitor release of a lock of the identified object, and delete the object when the lock of the identified object is released.

* * * * *